US008762097B2

(12) United States Patent
Millet

(10) Patent No.: US 8,762,097 B2
(45) Date of Patent: Jun. 24, 2014

(54) METHOD AND APPARATUS FOR A THERMAL CONTROL SYSTEM BASED ON VIRTUAL TEMPERATURE SENSOR

(75) Inventor: Timothy John Millet, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 625 days.

(21) Appl. No.: 11/789,615

(22) Filed: Apr. 24, 2007

(65) Prior Publication Data

US 2008/0028778 A1 Feb. 7, 2008

Related U.S. Application Data

(60) Provisional application No. 60/835,643, filed on Aug. 4, 2006.

(51) Int. Cl.
*G01K 1/00* (2006.01)

(52) U.S. Cl.
USPC ............ 702/130; 702/57; 702/60; 702/64; 702/75; 702/79; 702/127; 702/132; 702/136; 702/181; 702/183; 702/186; 702/187; 702/178; 702/189; 374/100; 374/102; 374/170; 374/137; 374/152

(58) Field of Classification Search
USPC .......... 702/130, 57, 60, 64, 75, 79, 127, 132, 702/136, 181, 183, 186, 187, 178, 189; 374/100.102, 170, 137, 134, 152
See application file for complete search history.

(56) References Cited

U.S. PATENT DOCUMENTS

| | | | | |
|---|---|---|---|---|
| 5,324,916 | A * | 6/1994 | Goto et al. | 219/497 |
| 5,560,022 | A * | 9/1996 | Dunstan et al. | 713/300 |
| 5,915,232 | A * | 6/1999 | McMinn | 702/130 |
| 6,006,168 | A * | 12/1999 | Schumann et al. | 702/132 |
| 6,256,192 | B1 * | 7/2001 | Shannon | 361/679.06 |
| 6,336,080 | B1 | 1/2002 | Atkinson | |
| 6,535,798 | B1 * | 3/2003 | Bhatia et al. | 700/293 |
| 7,347,621 | B2 * | 3/2008 | Sri-Jayantha et al. | 374/166 |
| 7,451,332 | B2 | 11/2008 | Culbert et al. | |
| 7,529,948 | B2 | 5/2009 | Culbert et al. | |
| 7,562,234 | B2 | 7/2009 | Culbert et al. | |
| 2005/0128700 | A1 | 6/2005 | Alperin et al. | |
| 2006/0013281 | A1 * | 1/2006 | Sri-Jayantha et al. | 374/163 |
| 2006/0064999 | A1 * | 3/2006 | Hermerding et al. | 62/259.2 |
| 2006/0231639 | A1 * | 10/2006 | Harper et al. | 236/94 |
| 2007/0067136 | A1 | 3/2007 | Conroy et al. | |
| 2007/0160097 | A1 * | 7/2007 | Behringer et al. | 372/34 |

OTHER PUBLICATIONS

TechARP, Thermalight SI-120 CPU cooler review, Jun. 23, 2006.*
Bar-Cohen et al., Fundamentals of thermal management, Chapter 6, 2004.*
PCT Search Report and Written Opinion for PCT International Appln No. PCT/US2007/017280, mailed Feb. 4, 2008 (14 pages).

* cited by examiner

*Primary Examiner* — Johnathan Teixeira Moffat
*Assistant Examiner* — Hyun Park
(74) *Attorney, Agent, or Firm* — Blakely, Sokoloff, Taylor & Zafman LLP

(57) ABSTRACT

In one aspect, a data processing system includes a virtual temperature sensor to provide system temperature for different system configurations, and a controller coupled to the sensor to control operations of the data processing system according to the virtual temperature. The virtual temperature sensor typically derives the temperature of a particular configuration of the data processing system using mathematical models or one or more operating parameters of the data processing system. In one example, the mathematical models include a characterization table which provides the measured temperature data from various system configurations. These measurements are performed with temperature sensors positioned in ideal locations for different configuration, and are preprocessed to provide the virtual temperature computation. The characterization table also includes thermal characteristics, such as thermal time constant and thermal resistance, of the critical components at multiple thermal control states.

84 Claims, 12 Drawing Sheets

METHOD AND APPARATUS FOR A THERMAL CONTROL SYSTEM BASED ON VIRTUAL TEMPERATURE SENSOR

This application is related to and claims the benefit of the filing date of U.S. Provisional Patent Application No. 60/835,643, filed on Aug. 4, 2006.

FIELD OF THE INVENTION

At least some embodiments of the present invention relate generally to data processing systems, and more particularly but not exclusively to the management of temperatures in data processing systems.

BACKGROUND

Traditionally, computer systems are designed to be able to continuously run a fairly worst-case thermal load corresponding to a worst-case workload. Designs according to such a continuous worst-case load have never been much of a problem, because traditionally the individual components have had modest operating power consumptions and the computer systems have had considerable cooling capacity so that the systems could sustain the load fairly naturally.

As the operating power consumptions of the individual components of computer system creep upwards, the thermal budgets of the computer systems have become tighter. The systems have become more difficult to cool. It is now becoming a challenge to design a computer system to run continuously at the worst-case thermal load while pursuing other high performance goals, such as high computing power, compactness, quietness, better battery performance, etc.

The thermal management system of a computer system typically includes a closed-loop temperature control, which includes a temperature sensor and a controller to regulate either the cooling system or the power generation to achieve a desired temperature, typically below a maximum allowable temperature. The closed-loop temperature controller constantly measures the temperature of the computer system through the temperature sensor, and controls the system cooling parameters such as a fan speed to keep the system temperature under the temperature limit. Further, the controller can adjust the system temperature by changing the heat generation within the computer system, either by adjusting the power or the frequency. There are various methodologies to control the temperature using a closed-loop temperature control system, with the popular method being a PID controller, which varies the amount of the system's heating generation or cooling capacity depending on the temperature difference.

One of the critical issues in thermal management system is the location of the temperature sensor since the system temperature distribution is likely not uniform, and therefore the temperature sensor is typically best located in the hottest location to assure that the whole system is under the temperature limit.

Current computer systems do not provide convenient or ideal locations for temperature sensors. A further temperature control problem associated with current computer systems is the variation of hottest temperature locations, occurring due to the optional components that can be dynamically inserted or removed. For examples, a floppy drive may or may not be installed, an extra video card may be installed, a CD drive may be exchanged with an extra battery, a PCI card may or may not be installed, etc. Each system configuration has its own ideal location for a temperature sensor, and therefore the multiple system configurations make an optimum temperature sensor placement difficult and often impractical. A thermal control system which does not have an accurate way to measure a "system" temperature is forced to assume the worst case thermal scenario.

For a system where the optimum temperature sensor location changes with user's configurations, a thermal control system is blind to certain critical component temperatures and certain system configurations, and is forced to assume the worst, resulting in a reduced performance or an overcooled system with unpleasant acoustic output (e.g. the noise of a fan) due to excessive cooling operations.

SUMMARY OF THE DESCRIPTION

Methods and apparatuses for providing a virtual temperature sensor to control temperatures or other parameters in a data processing system are described here. Some embodiments of the present invention are summarized in this section.

In one aspect of an embodiment of the present invention, a data processing system having more than one component configurations includes a virtual temperature sensor to provide a system temperature for different component configurations. The virtual temperature sensor typically derives the temperature of a particular configuration of the data processing system using mathematical models and/or one or more operating parameters of the data processing system.

In one example of an embodiment, the virtual temperature sensor includes a characterization model (e.g. a table or an empirical formula) which uses measured temperature data from various different system configurations. The characterization model may be created in the development of a product before it is sold to a consumer by making temperature measurements, in the different system configurations, in a specimen of the product which is not intended to be sold to a consumer. These measurements are performed with one or more temperature sensors positioned in ideal locations for different configurations, and are preprocessed to provide the virtual temperature computation. The characterization table can also include thermal characteristics, such as thermal time constant and thermal resistance, of the critical components at multiple thermal control states.

In one example of an embodiment, the virtual temperature sensor comprises system power sensors, or system configuration information as primary inputs to the virtual temperature calculation. In another example, the virtual temperature sensor further includes an ambient temperature sensor to provide delta system temperature, independent of the changes in environment temperature.

In one aspect of an embodiment of the present invention, a data processing system includes a virtual temperature sensor to accommodate a plurality of system configurations, and a controller (e.g., a microcontroller or a microprocessor) coupled to the sensor to control operations of the data processing system according to the virtual temperature. The virtual temperature sensor provides a representation of a system temperature for various possible component configurations, thus together with the controller, providing a complete thermal management system for many users' configurations of the data processing system with various removable components.

In one example of an embodiment, the virtual temperature sensor comprises system power sensors, physical temperature sensors, and/or system configuration information (e.g. cooling system status, such as fan speed for each fan, etc.) as primary inputs to the virtual temperature calculation.

In one aspect of an embodiment, the thermal management employs temperature prediction to control voltage settings or frequency settings to manage the temperature of the data processing system.

In one aspect of an embodiment, a method to control a data processing system includes the determination of the system temperature through a virtual temperature sensor. In one aspect, the method further includes the control of the operations of the data processing system according to the virtual temperature.

The present invention includes apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
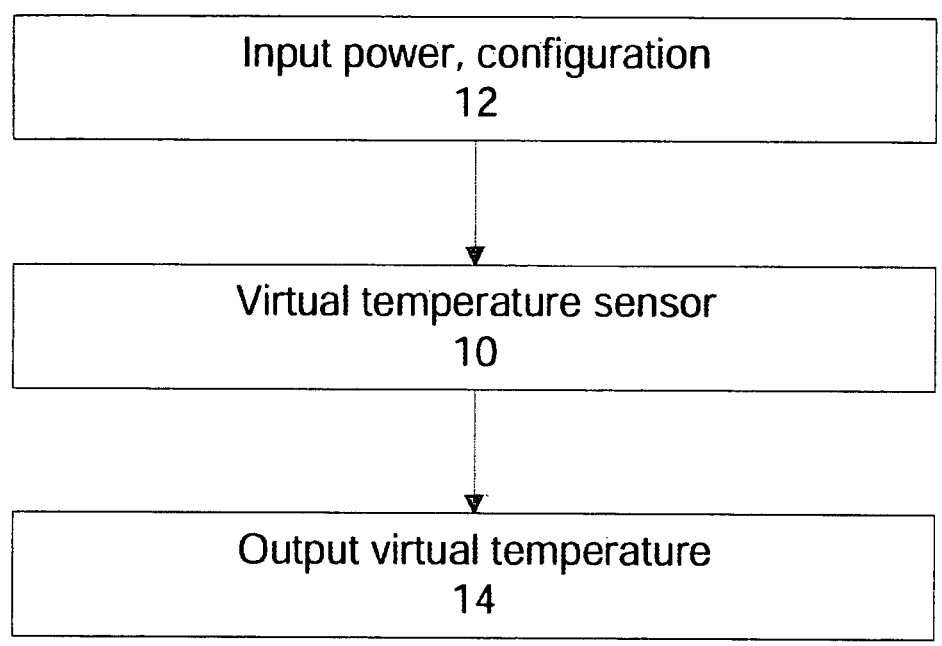
FIG. 1 illustrates a method to generate a virtual temperature according to one embodiment of the present invention.

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

In one aspect of an embodiment of the present invention, a data processing system includes a virtual temperature sensor to provide a system temperature to accommodate different system configurations. The virtual temperature sensor provides temperature information from calculations instead of a physical temperature sensor, although these calculations may use either current or stored temperature readings from physical temperature sensors. This temperature information is typically derived from the dynamics quantities of the operating parameters of the data processing system for a particular configuration of the data processing system. A virtual temperature sensor may, in at least certain embodiments, be hardware processing logic or may be software executing on a processor or a combination of both. A virtual temperature obtained or derived from a virtual temperature sensor may not match any temperature readings from physical temperature sensors in a data processing system. A virtual temperature may represent a prediction or estimate of a current temperature in a system, such as a current temperature in an ideal location of the system as it is operating (and creating heat) even if there is no temperature sensor at that location. A virtual temperature obtained or derived from a virtual temperature sensor may be computed as a difference ("delta") from a temperature measured by an ambient physical temperature sensor and thus the virtual temperature naturally adapts to different ambient temperature environments. A virtual temperature obtained or derived from a virtual temperature sensor may be used as an input to a conventional closed loop thermal control mechanism which is used with conventional temperature sensors in a system. In at least certain embodiments, a computed virtual temperature does not simply track the final steady state temperature, but instead follows an exponential temperature curve of the real components because the computed virtual temperature can be based on the characterized time constant of the components in a system (and hence can provide accurate time-varying temperature estimates).

The location of one or more temperature sensors may be important for an active thermal management controller since it is the input indicating the performance of the thermal management system. The ideal location for a temperature sensor is compoundedly difficult for systems with optional components, such as peripherals, etc., that can be dynamically inserted or removed. It is virtually impossible to employ just one temperature sensor to accurately represent the system temperature for all possible component configurations, especially when the thermal generation of the components varies vastly. It might be possible to implement multiple temperature sensors at multiple locations, but this solution is hardly practical, especially when a movable optional component might interfere with a sensor location.

FIG. 1 shows an exemplary method for using a virtual temperature sensor 10 according to an embodiment of the present invention. The input 12 to the virtual temperature sensor 10 can be power, measured from power sensors (system or component power), system configuration, retrieved from a configuration table, cooling level, e.g. fan speed, measurements from physical temperature sensors or any combination thereof. The cooling level input can be used to predict the current thermal resistance. Thermal resistance is inversely proportional to the current cooling level and can be used with power to compute the virtual temperature. The output 14 of the virtual temperature sensor 10 is a temperature, represented in a physical temperature logic representation, to be readily adapted for use by a thermal controller accustomed to values from a physical temperature sensor.

In an embodiment, the virtual temperature sensor according to the present invention can be implemented to provide a system temperature for various system configurations. The virtual temperature sensor may be considered to be logic which receives a plurality of measured input parameters and applies these input parameters to a dynamic mathematical model. The model correlates the measured input parameters to output a temperature value that represents the actual temperature under the conditions indicated by the measured input parameters. The model can further provide thermal characteristics of the system configuration, represented by the various removable components, for use in calculating the time dependent variation of the temperature. In an example, the virtual temperature sensor logic represents conventional physical temperature sensor logic, and thus can be implemented directly into existing thermal control algorithms designed for physical temperature sensor inputs. Thus a thermal control system employing a virtual temperature sensor can also use the same control algorithm(s) used with a physical temperature sensor to support a virtual temperature sensor.

In an embodiment, the virtual temperature sensor comprises a characterization table, representing the measured temperatures from various different system configurations. These measurements may be obtained from a non-production model of a system which is used for test and reference purposes and which is configured in different configurations and then tested to obtain temperature measurements in the different configurations. The data in the characterization table may, in an embodiment, store the values such as R and rc, used in a virtual temperature computation, such as the computation of $T_v$ described below, and these values may be determined for a plurality of different system configurations. Data in the characterization table may be obtained from such measurements from physical temperature sensors placed in ideal positions, which may be the locations that physical temperature sensors would have been placed in a production system if it had been practical. The measured data (e.g. measured temperatures) can also be pre-processed to provide thermal characteristics (e.g. thermal time constant (such as rc), thermal resistance (such as R), cooling parameters) of various critical components at multiple thermal control states. This data can then be stored in a data structure, such as a characterization table stored in non-volatile memory in production models sold to customers for use by those customers.

Thus, in an example, the virtual temperature sensor may use a sophisticated look-up table where, with an input of a particular configuration, the temperature of that configuration can be accurately accessed. Using a time-varying input, the virtual temperature sensor can also provides accurate time-varying temperature estimates.

In an embodiment, the virtual temperature sensor may be based on one or more thermal physics calculations with time dependent characteristics, providing the time dependent temperature and the temperature projection estimates, based on the thermal characteristics of the controlled components. In an example, a steady state temperature $T_{ss}$ for a given system configuration and a given power and cooling configuration can be computed from a power input P and the thermal characteristics of a thermal resistance R and cooling parameter C, e.g. the current output level (e.g. fan speed(s) for one or more fan) of the cooling system, and can be represented as $$T_{ss} = P \times R \cdot C$$

Hence, using power (P), R, and C as inputs, $T_{ss}$ may be calculated and then used in a virtual temperature computation. In a typical embodiment, one or more operating system components or other software or hardware components determine the current system configuration (e.g. whether certain PCI cards or additional storage devices are currently present in the system), and this current system configuration is used to select data values, such as data values from a characterization table having R and rc values for different system configurations, for use in these calculations of $T_{ss}$ and $T_v$. A time dependent virtual temperature $T_v$ can be calculated from a heat conduction and convection formula, employing thermal characteristics of the system components, such as the thermal time constant rc of the components (which may be characterized), the steady state temperature $T_{ss}$ and the ambient temperature $T_{amb}$ $$T_v = T_{amb} + \left(T_{ss} + (T_v - T_{ss})e^{-\frac{t}{rc}}\right)$$

In an example, the virtual temperature calculation may use a fixed-point linear approximation for the thermal equation, making it practical to be implemented in a typical 8-bit thermal management microcontroller. Some of the computation can also be performed in advance and stored in table form to further reduce computational burdens. The result (e.g. $T_v$) may be used as an input to thermal and/or power closed loop control mechanisms, such as those mechanisms described herein.

In an embodiment, the virtual temperature sensor uses power sensors to measure power as a primary input to the virtual temperature calculation and does not use an internal (within the housing of the data processing system) measurement of temperature. The power sensors are typically much easier to place than the temperature sensors, especially with removable and installable optional components since power sensors are location independent. In one example, the characterization table comprises measured power as an input to retrieve the system virtual temperature. Knowing the power, the steady state system temperature can be calculated and, knowing the thermal characteristics, a time dependent temperature can be estimated to provide the virtual temperature output for a current or future virtual temperature. In one example, power sensors are provided for the data processing system, or for various critical components, thus the characterization table can calculate a virtual temperature for a particular component configuration to ensure better temperature accuracy.

In an embodiment, the virtual temperature sensor uses system configuration as an input to the virtual temperature calculation. Knowing the system configuration (e.g. the amount of RAM in the system, the number and type of peripherals in the system, etc.), the characterization table can provide an accurate system virtual temperature.

In one example of an embodiment, an ambient temperature sensor is included so that the virtual temperature is computed as a delta temperature, and thus the virtual temperature sensor is naturally adapted to different ambient environments. The ambient temperature sensor is typically placed on a fixed component of the system to provide a base temperature of the environment, as discussed further below.

In one aspect of an embodiment of the present invention, a data processing system includes a virtual temperature sensor to accommodate a plurality of system configurations, and a controller (e.g., a microcontroller or a microprocessor) coupled to the sensor to control operations of the data processing system according to the virtual temperature. This microcontroller or microprocessor may also implement the virtual temperature sensor by executing software which acts as the virtual temperature sensor. The virtual temperature sensor typically derives the temperature of the data processing system using mathematical models or one or more operating parameters of the data processing system. The virtual temperature sensor can comprise a characterization table to provide a virtual temperature, together with the thermal characteristics of the critical components for a time dependent temperature estimates.

In one example of an embodiment, the data processing system includes a computer system with optional components or ports such as additional memory, PCI cards, ASA cards, an additional hard drive, optical drive, battery, etc. and the system configuration for a given state of a system typically depends upon whether or not these optional components or ports are present in the system. The controller can include a temperature management system to monitor the virtual temperature and to manage the thermal budget.

Figure 2:
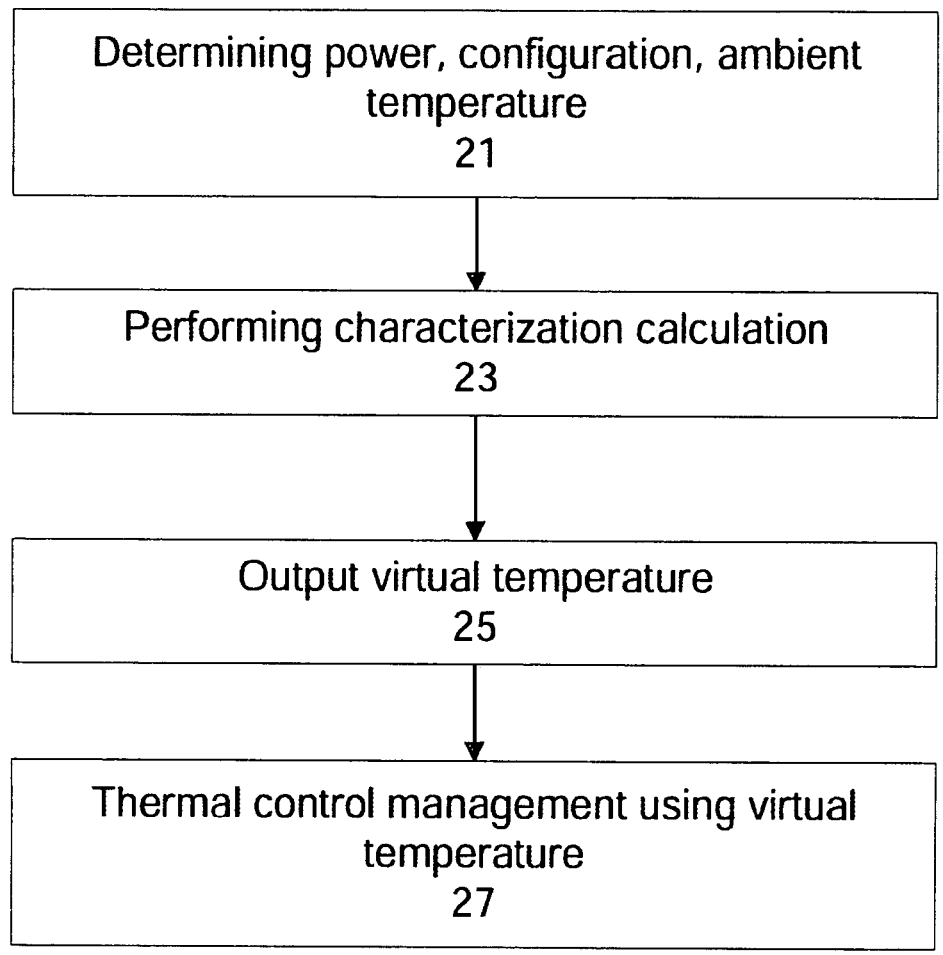
FIG. 2 illustrates a method to generate and use a virtual temperature in a computer system according to one embodiment of the present invention.

FIG. 2 illustrates a method of thermal management according to an embodiment of the present invention. In FIG. 2, operation 21 determines at least one of the power of a data processing system (e.g. a current reading in amps for a microprocessor or a frequency and voltage setting of a microprocessor, etc.), the system configuration, the ambient temperature of an environment in which the data processing system is running, the system cooling level, e.g. current fan speed, or a combination thereof. Operation 23 represents a virtual temperature sensor logic, which receives the input from operation 21, and provides a temperature output in operation 25. The virtual temperature sensor logic in operation 23 can further provide the thermal characteristics of the critical components. Operation 27 represents an operation of a thermal management controller, which operation may include comparing the virtual temperature with the target control temperature based on the system power consumption, and adjusting the cooling or the performance (e.g. frequency and/or voltage of one or more processors) parameters accordingly.

The controller can be a part of a main Central Processing Unit (CPU) microprocessor, or can be a part of an auxiliary microprocessor or a microcontroller, such as a microprocessor configured to perform thermal management control, or can be a part of both microprocessors or a microprocessor and a microcontroller.

In one example of an embodiment, the data processing system further includes an ambient temperature sensor to determine an ambient temperature of an environment of the data processing system. The controller may control the operations of the data processing system according to the virtual temperature and the ambient temperature. The ambient temperature is typically the temperature of the environment surrounding the data processing system. With the ambient temperature input, the virtual temperature sensor can deliver a delta temperature, which is the difference between the system temperature and the ambient temperature. The delta temperature setting enables the system to work with different ambient temperatures.

In one example of an embodiment, a data processing system includes a plurality of physical temperature sensors to determine a plurality of actual temperatures for the data processing system. The additional physical temperature sensors provide a safeguard to the virtual temperature sensor.

In one aspect of the invention, the virtual temperature sensor is used for the determination of a representation of actual temperature in a data processing system employing a thermal management system. The control system in the thermal management system adjusts the cooling parameters when the data processing system does not run under high demand load, thus reducing excessive fan noise while still maintaining the system temperature under the limit. The control system in the thermal management system adjusts the power usage when the data processing system faces the possibility of exceeding the temperature limit, even with maximum cooling capacity. The power adjustment operation is described below, with the actual system temperature determined by the virtual temperature sensor, calculated through a mathematical model such as a characterization table.

One embodiment of the present invention uses thermal throttling to allow a system to run under the dynamically determined thermal budget so that the system can operate in an appropriate operating setting under the dynamically determined thermal limit for the current workload, even if the system may not be capable of sustaining a worst-case workload under certain normal usage conditions. Further details about dynamic thermal control and dynamic power estimation and control can be found in co-pending U.S. patent applications, entitled "Methods and Apparatuses for Dynamic Thermal Control", U.S. patent application Ser. No. 11/212,983, filed Aug. 25, 2005, "Methods and Apparatuses for Dynamic Power Control", U.S. patent application Ser. No. 11/212,970, filed Aug. 25, 2005, and "Methods and Apparatuses for Dynamic Power Estimation", U.S. patent application Ser. No. 11/212,974, filed Aug. 25, 2005, all by inventors Dave Conroy, Keith Cox, Michael Culbert, which are hereby incorporated herein by reference.

In the prior art, computer systems were typically designed to have sufficient cooling capabilities, or limited worst-case power consumptions, such that when in a continuous worst-case power consumption mode corresponding to the worst-case workload the computer system is not over heated to exceed thermal limits. In the worst-case scenario, all of the components of the computer system were drawing their maximum (in this case, worst level) amount of power. This worst case scenario essentially adds together the worst case, maximum level, power consumption; and for the cooling aspect of the computer system the design took this scenario into account to allow the system the sufficient capability of dissipating the heat generated from the continuous worst-case power consumption.

However, such a worst-case scenario typically occurs rarely (infrequently). Thus, designing a computer system to sustain the worst-case load can be overly conservative for typical usages.

In one embodiment of the present invention, it is recognized that power consumption in a computer system typically changes frequently during typical usages. Typically, not all components are simultaneously in the maximum power consumption mode. Further, some components may not be in the maximum power consumption mode for a long period of time. The power consumption of a component, such as the central processing unit (CPU) microprocessor, may change dramatically over time in typical usages. Thus, design a computer system according to the worst-case load can be overly conservative for typical usages.

In one embodiment of the present invention, a computer system has controls on the cooling capacity of the system to prevent excessive cooling power consumption or noise generation. The controls vary the maximum cooling capacity, or select various cooling settings, such as controlling a fan speed, or engaging a secondary cooling system, according to a measured ambient temperature and the virtual temperature.

In one embodiment of the present invention, a computer system has controls (throttles) on sources of heat (e.g. the main microprocessor(s), graphics controller for driving displays, etc.) which are attached to a part of the system which is to be prevented from getting too hot. The throttles limit the maximum power which can be consumed by the sources of heat, which limits the rate at which the temperature can rise. The throttle settings may correspond to different settings of performance levels or different operating settings.

For example, the CPU (central processing unit) microprocessor may work under different core voltages and core frequencies. Using a high core voltage and a high frequency, the microprocessor can be optimized for computations with higher power consumptions. Using a low core voltage and a low frequency, the microprocessor can be optimized for battery performance (e.g. lower power consumption) at a degraded computational performance level.

In one embodiment, the microprocessor can shift from one voltage level to another by slowly changing the voltage and from one frequency to another by slowly changing the frequency without stopping or pausing the computational tasks of the processor. Further details on changing CPU core voltage and frequency can be found in U.S. patent application Ser. No. 10/917,719, filed Aug. 12, 2004, which is hereby incorporated herein by reference.

In one embodiment of the present invention, the computer system dynamically arranges the throttle settings so that the temperature to be controlled does not rise beyond the system's limits.

In one embodiment of the present invention, a computer system is designed to optimize performances for typical usages. However, worst load cases can occur. To avoid damage to the computer system, a dynamic power management system is used to dynamically budget the power usage of at least some of the components of the computer system such that when the heavy tasks are imposed on the system, the system can trade performance for staying within the thermal limits.

In general, thermal time constants are fairly long in comparison to the time periods for adjusting the throttle settings. In one embodiment of the present invention, when a temperature is observed to get close to the system's limits, the system can quickly arrange that the power consumption requirement of the heat source is reduced even if the component is to run the worst-case workload; and the power of the troublesome heat source is reduced long before the temperature actually exceeds the system's limits. Thus, the system degrades performance on demand in response to current thermal conditions, which depend on the current ambient temperature, the current temperature(s) of the computer, etc.

In one embodiment of the present invention, a computer system has throttled components, one or more sensors to measure the temperature(s) of the part of the system being managed, and one or more sensors to measure conditions to predict the rate at which the part of the system being managed cools down, such as the ambient temperature.

In one embodiment, to implement thermal throttling, the computer system determines the actual (measured) temperature of the part of the system and predicts the corresponding temperature that may occur after a period of time of worst-case workload, based on the power consumption requirement of the throttled component(s) for the worst-case workload, the measurement of conditions for cooling (e.g., ambient temperature) and the current actual temperature.

In one embodiment, a throttle setting is selected and used such that the predicted temperature is in accordance with the thermal constraint. For example, different throttle settings can be examined to determine whether or not the throttle settings are allowable; and a "best" allowable setting can be selected for use in the next time period.

Alternatively, an allowable amount of power consumption can be determined for the throttled component(s) such that, if the power consumption of the throttled component(s) is below the allowable amount, the predicted temperature will be less than the thermal threshold. The allowable amount of power consumption can then be compared to the worst-case power usage requirements of different throttle settings to determine the allowable throttle setting.

In one embodiment, the selection of the allowable throttle setting is performed frequently (e.g., in time period(s) less than the thermal time constants of the system) and periodically. For example, the dynamical thermal control can include the following operations.

1) Measure T, the current temperature of the part of the system being managed.
2) Adjust T to account for heat loss in the subsequent period of time.
3) For throttle setting i, set $T_{max}[i]$, an estimate of the highest temperature which could be reached at the throttle setting, according to the heat generated by the worst-case power consumption at the throttle setting i.
4) Determine the highest throttle settings for which $T_{max}[i]$ is less than or equal to the system's limit and make this the current throttle setting until the next iteration of the thermal throttling. In one embodiment, the higher throttle settings are more desirable than the lower throttle settings (e.g., faster, quieter, etc.)

As an example in one embodiment, if the heat loss is mainly convective, the adjusted temperature Ta to account for heat loss in a time period Δ can be evaluated according to:

$$T_a = T_{amb} + (T - Tamb)e^{-\Delta/\tau cool},$$

where $T_{amb}$ is a measurement of the ambient temperature; and $\tau_{cool}$ is the time constant of the convective cooling path.

As an example in one embodiment, the temperature after the period of time Δ can be predicted according to the thermal consequences of a pulse of power $P_{max}[i]$ being applied to the part of the data processing system, such as a computer. For example, the predicted temperature $T_{max}[i]$ at throttle setting "i" can be computed according to:

$$T_{max}[i] = T_a + P_{max}[i]\mathit{f}(1.0 - e^{-\Delta/\tau heat}),$$

where $P_{max}[i]$ is the maximum power consumption of the heat source at the throttle setting i; θ is the thermal resistance between the heat source and the part of the system being managed; and $\tau_{heat}$ is the time constant of the heating path.

In general, the prediction may involve more parameters to account for factors, such as the influence of a heat-generating neighbor, working condition of cooling units and/or other modes of heat dissipation, such as radiative heat dissipation.

In one embodiment of the present invention, the prediction of the temperature is based on the actual (measured) current temperature and predicted for a short time period. Since prediction error does not accumulate, the prediction does not have to be very accurate.

In one embodiment of the present invention, the time period Δ is small when compared to the time constants of the heating and/or cooling paths. For example, time period Δ is smaller that $T_{heat}$.

Radiative heat dissipation is typically much slower than convective heat dissipation. The radiative heat dissipation typically can be neglected when the convective cooling is present. In systems where the convective heat dissipation is weak (e.g., a system without a fan, a system in an enclosed housing, etc), the radiative heat dissipation may become important. In general, a prediction may be based on an analytical thermal approximation, an empirical expression, or combinations of analytical solutions and empirical expressions.

Note that although the above example describes a situation where convective cooling dominates and the time constant of cooling is constant, the methods of prediction can be extended to account for other cooling processes and to account for time constants of cooling which are functions of a throttle parameter. For example, a convective cooling system with a variable speed fan can have throttle settings for fan speed; and the time constant $\tau_{cool}$ can be a function of fan speed.

Further, the prediction can also be extended to deal with the situation where there are multiple heat sources attached to the same part of the system. The predicted temperature can be computed from a sum of the contributions from the various attached heat sources. For example, $$T_{max}[i] = T_a + P_{1,max}[i]\theta_1(1.0 - e^{-\Delta/\tau_{heat1}}) + P_{2,max}[i]\theta_2(1.0 - e^{-\Delta/\tau_{heat2}}) + \ldots$$

wherein the $P_{1,max}[i]$, $P_{2,max}[i]$, ... are the maximum power consumptions of the heat sources 1, 2, ... at the throttle setting i; $\tau_{heat1}$, $\tau_{heat2}$, ..., are the time constants of the corresponding heating paths; and $\theta_1$, $\theta_2$, ..., are thermal resistances between the heat sources and the part of the system being managed.

In one embodiment of the present invention, multiple copies of throttle settings can be determined based on different constraints, for example, one for each boundary condition of temperature. The lowest one of the multiple copies of throttle settings is then used to ensure that all constraints are satisfied. Typically, the performance is set by the subsystem which is in the most trouble.

Further, in one embodiment of the present invention, multiple copies of throttle settings can be further determined based on different constraints, for example, one for each boundary condition of power. For example, the system may not have a power supply (e.g., battery) that can continuously sustain power consumption above a certain limit (e.g., a limit on the average discharge current for the continuous usage of a battery without causing damage or degrading the battery performance). Based on the actual past power usage history, one or more copies of throttle settings can be determined based on the power usage constraints. The lowest one of the multiple copies of throttle settings can then be used to ensure that all constraints, thermal and power, are satisfied.

The dynamic throttle setting determination can be performed in a variety of components in the computer system, including the main processor of the computer system, or a microcontroller dedicated to the dynamic thermal throttling task or other tasks.

There are advantages to executing the algorithms in the main processor, such as reduced cost, and the elimination of any need to communicate between the main processor and whatever other agent that is alternatively used to perform the task. However, it may be difficult to arrange dynamic thermal throttling in all situations, including when the software in the main processor fails or is replaced with some other software which has no processes for thermal management. Further, when the computer system is in an otherwise idling state, the periodic thermal and/or power management task may prevent the main processor from entering a low power state, or may cause the main processor to periodically wake from the low power state.

When the ability to load throttle settings is reserved to the main processor of the computer system and the dynamic throttle determination is not performed in the main processor, a process of making the computed throttle setting the current throttle setting may become complicated. The throttle settings need to be communicated to the main processor; and in most situations, it may be necessary to implement fail-safe mechanisms to deal with the (unlikely) case that the software running in the main processor ignores the command to load or change the states of the throttles. The fail-safe mechanisms can be fairly crude, since they should only be engaged in emergency situations. For example, when the microcontroller determines that the temperature that is controlled is exceeding a limit, the microcontroller may assume that the throttling settings are not enforced properly and automatically initiate a shutdown or slowdown process.

One embodiment of the present invention dynamically budgets the power usage for components of a data processing system that may have a thermal constraint, such as in thin-and-light portable computers, or larger portables, and/or small consumer desktops. For example, the constraint of heat dissipation on a computer system with a compact housing may limit the power usage. In one embodiment, the real-time heat dissipation condition is used to dynamically budget the power consumption and prevent overheating from excessive power consumption.

Figure 3:
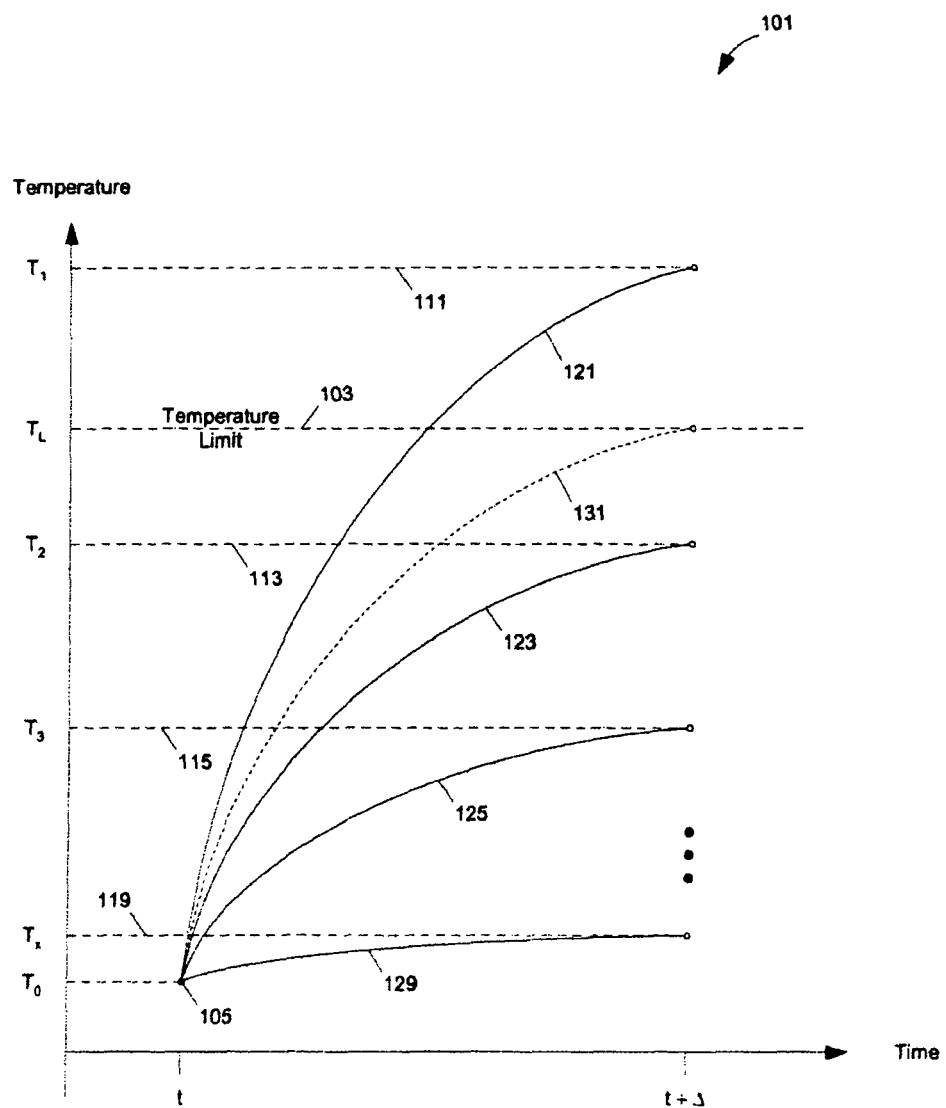
FIG. 3 illustrates, through a graph, a method to control a temperature in a data processing system according to one embodiment of the present invention.

FIG. 3 illustrates, through a graph, a method to control a temperature in a data processing system, such as a computer system, according to one embodiment of the present invention.

In FIG. 3, a current actual temperature (e.g., measured temperature at time instant t) is used to predict the temperature after a period of time $\Delta$ (e.g., predicted temperature at time instant t+$\Delta$).

In one embodiment, a computer system has a number of different settings. For example, the CPU processor of the computer system may be set to run under different core voltages and/or different core frequencies. Different settings of the CPU processor correspond to different worst-case power usages. Further, for example, a cooling fan may be set to run at different speeds.

In general, the different settings correspond to different performance levels with different impacts on heat generation/dissipation. Thus, adjusting the settings of the computer system can adjust the trade-offs in the performance of the system, such as computing speed, quietness, battery life, etc. and the thermal status of the system.

The power requirement at each setting corresponds to the maximum possible power usage at the corresponding setting. Depending on the tasks being performed, the actual power consumption can vary within a range; and the actual power consumption is typically and frequently less than the maximum possible power usage.

When the computer is given the worst-case workload, the temperature of the part of the computer typically changes (e.g., rises or falls) differently at different settings.

For example, the temperature of the part of the computer is $T_0$ (105) at time t. When the computer is given the worst-case workload, the temperature may change according to curves (121, 123, 125, ..., 129) during the time period $\Delta$ after time t to temperatures $T_1$ (111), $T_2$ (113), $T_3$ (115), ... $T_x$ (119) respectively.

In one embodiment of the present invention, instead of designing the system to sustain the continuous worst-case workload for the top performance setting for a long period of time, the system is designed to automatically select a performance setting for a short period of time $\Delta$ such that after the time period the temperature is within the limit (103). If the current temperature ($T_0$) is low, the system may allow to be set to the top performance setting; if the current temperature ($T_0$) is high, the system will choose a reduced performance setting.

In the example of FIG. 3, the performance setting corresponding to the curve (121) is not allowable since if the computer were set to this performance setting and given the worst-case workload during the time period $\Delta$, the temperature of the part of the computer will reach $T_1$ (111) and exceed the limit $T_L$ (103). The performance settings corresponding to the curves (123, 125, 129, ...) are allowable according to the temperature limit $T_L$ (103).

In one embodiment of the present invention, the temperatures $T_1$ (111), $T_2$ (113), $T_3$ (115), ... $T_x$ (119) at the time $t+\Delta$ are predicted using the current temperature $T_0$ and other parameters, such as ambient temperature for the cooling, etc., to select the allowable setting for the computer for the time period between time t and $t+\Delta$.

Since the worst-case workload is assumed for the time period $\Delta$ the actual temperature after the time period $\Delta$ will be no more than the corresponding temperatures $T_1$, $T_2$, $T_3$, ..., $T_x$ for the corresponding settings.

The typical usage of computer systems (e.g., portable computers or desktop computers) may not require a continuous worst-case power load for a long period of time. Typically, a burst of computational tasks may require an instantaneous worst-case power load which lasts only for a short period of time before the tasks are completed. Before and after the burst of the tasks, the computer system typically consumes a power load that is much lower than the worst-case power load, and the computer system is at a low temperature. Thus burst of power consumption may or may not be sufficient to cause the temperature to rise above the temperature limit. Typically, the part of the computer heats up for a short period of time and then cools down before the temperature exceeds the limit. Thus, it may be tolerable to allow bursts of high computational performance for typical usage. This allows the design of a computer system that delivers high performance under tight thermal constraints for typical usage.

In one embodiment of the present invention, the system dynamically adjusts power usage so that even when the worst-case power load for these throttles occur, the temperature of the part of the computer does not rise to exceed the limit. Since worst-case power loads are rare, the throttle controls are normally set to very high values, and the system acts as if the limit does not exist since the demand of the system is lower than the dynamically determined budget.

In one embodiment, the time period for determining the throttle setting may not be constant. For example, when a significant power usage event occurs (e.g., when the temperature is approaching the limit), the system may automatically change the time period for starting a new computation of the throttle setting. For example, the system may adjust the time period when the fan speed changes.

Typically, the components (subsystems) whose throttle is adjusted may not actually consume the entire amount of power that is budgeted, since these components may not be busy enough to run at the maximum power load for the throttle setting. The adjustment of the throttle allows the subsystem the freedom to consume up to the worst-case power load for the corresponding throttle setting without violating power constraints.

The cooling of the computer system is typically a function of the current ambient temperature. In one embodiment of the present invention, the ambient temperature of the environment to which heat generated from the power consumption of the computer is dissipated is measured for the prediction of the worst-case temperatures for different settings and for the selection of the setting that will not violate the temperature limit.

Alternatively, the allowable amount of power consumption can be determined from targeting the predicted temperature at the temperature limit (e.g., according to curve 103). The allowable amount of power consumption can then be used to select the throttle setting.

Figure 4A:
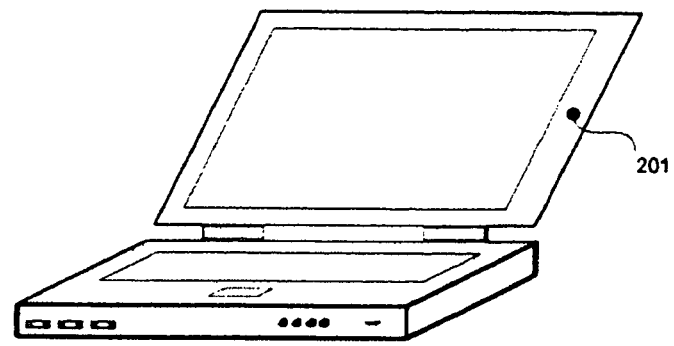
FIGS. 4A and 4B illustrate examples of locations to measure ambient temperature for thermal control according to one embodiment of the present invention.
Figure 4B:
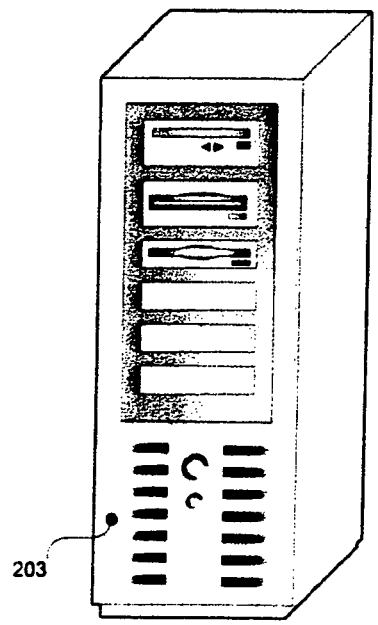

FIGS. 4A and 4B illustrate examples of locations to measure ambient temperature for thermal control according to one embodiment of the present invention.

In one embodiment of the present invention, one or more temperature sensors are used to determine the ambient temperature of the working environment of the computer. For accurate results of temperature prediction, the ambient temperature sensors are positioned away from heat sources and heat dissipation paths. A thermal insulator may be placed between the ambient temperature sensor and the external housing of the computer.

For example, a temperature sensor (201) can be positioned in the middle portion of the display panel of a portable computer.

For example, a temperature sensor (203) can be positioned near the side portion of a tower computer.

In one embodiment, the ambient temperature sensor is positioned near an opening in the housing of the computer. In one embodiment, the ambient temperature sensor is positioned on the path of intake cooling air that has the ambient temperature.

Figure 5:
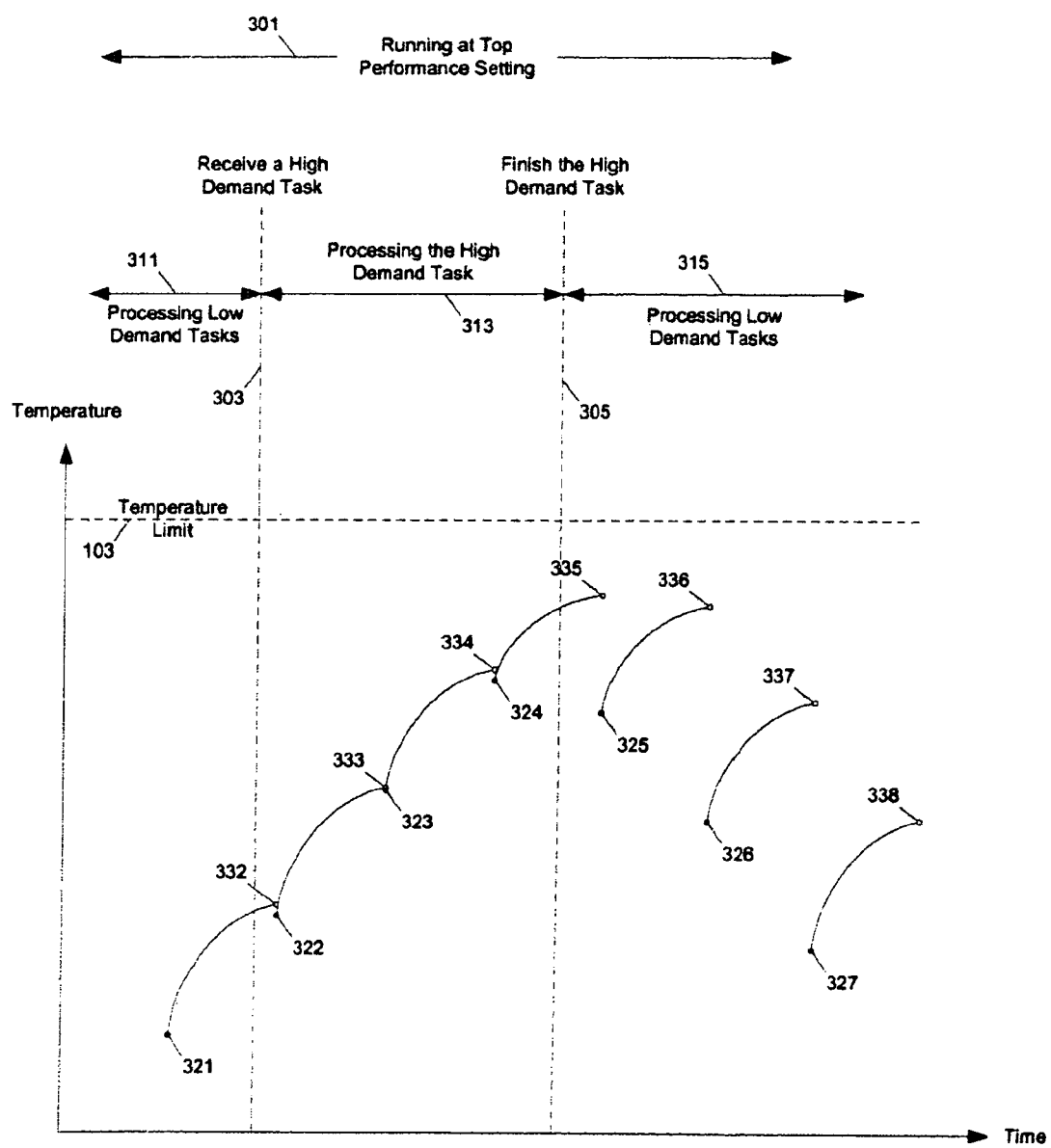
FIGS. 5-6 illustrate exemplary scenarios in a data processing system having dynamic thermal control according to one embodiment of the present invention.
Figure 6:
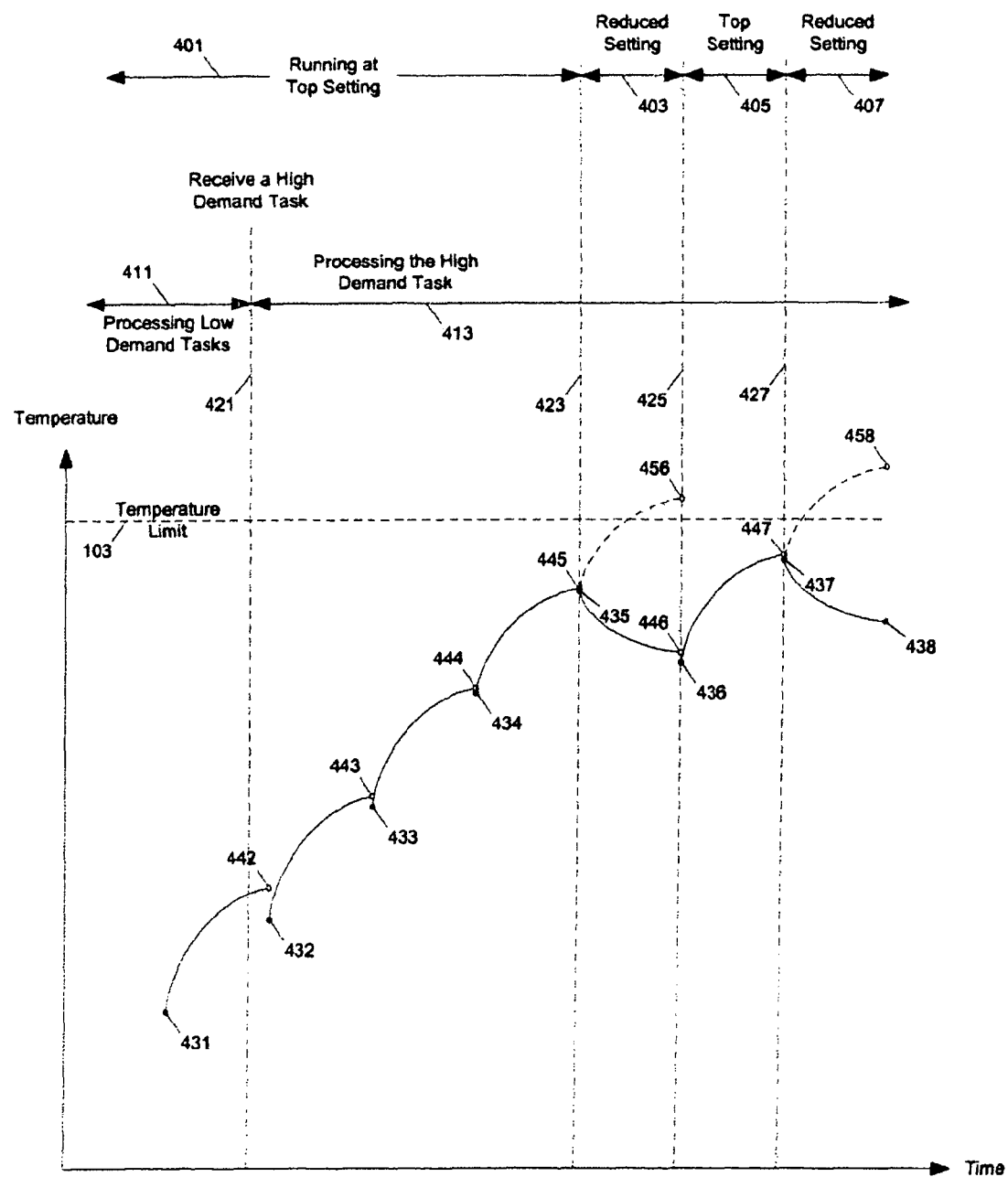

FIGS. 5-6 illustrate example scenarios in a data processing system having dynamic thermal control according to one embodiment of the present invention.

In the scenario of FIG. 5, the computer system processes (311) low demand tasks before time instance (303); the actual power consumed by the system is low; and actual temperature (321) is low and far below the temperate limit (103). Since the actual temperature of the system is low, the system can be at the top performance setting (301).

After time instance (303), a high demand task is received. The system becomes busy in processing (313) the high demand task. Since the system had a low temperature before the reception of the high demand task, the predicted temperatures (e.g., 332, 333, 334, 335) are lower than the temperate limit (103) even though the system remains in the top performance setting. The actual temperatures (e.g., 322, 323, 324) are typically lower than or close to the predicted temperatures (e.g., 332, 333, 334), since the system is processing the near worst-case load.

After each time period, the actual temperature is used as a starting point for the next prediction. Thus, prediction error is not accumulated.

After the high demand task is finished at time instance (305), the actual power usage comes down; and the actual temperature (e.g., 325, 326, 327) falls farther below the temperature limit (103). Since the predicted temperatures (336, 337, 338) are lower than the temperature limit (103), the system can remain (301) in the top performance setting to process (315) low demand tasks.

The usage pattern as illustrated in FIG. 5 can be a typical one for certain uses. Thus, the system can be designed on a tight thermal constraint while running at top performance setting which, if designed according to a continuous worst-case load, would require a much higher cooling capacity.

However, the high demand task can be such that it may take a long period of time to finish the task. If the system were allowed to be in the top performance setting for a long period of time, the temperature limit (103) would be eventually violated.

For example, in FIG. 6, before time instance (421) of receiving a high demand task, the system processes (411) low demand tasks, as indicated by the low actual temperature (431). The system is running (401) at top setting.

After the time instance (421), the system processes (413) the high demand task for a period of time.

Initially, the system remains (401) in the top setting, which causes the temperature of the part of the computer to rise (e.g., 432, 433, 434, 435). Since the predicted temperatures (442, 443, 444, 445) are below the temperature limit (103), the system remains running at the top setting.

At the time instance (423), the thermal manager recognizes that the predicted temperature (456) would be above the limit (103) if the system remains in the top setting and that the predicted temperature (446) would be below the limit (103) if the system changes to the reduced setting (403). Thus, between time instances (423 and 425) the system runs in the reduced setting.

At the time instance (425), the actual temperature (436) is reduced. The thermal manager recognizes that the predicted temperature (447) would be below the limit (103) if the system changes to the top setting (405). Thus, between time instances (425 and 427) the system runs in the top setting.

At the time instance (427), the actual temperature (437) is again approaching the limit (103). The thermal manager recognizes that the predicted temperature (458) would be above the limit (103) if the system remains in the top setting and that the predicted temperature (438) would be below the limit (103) if the system changes to the reduced setting (407). Thus, in a short time period after the time instance (427) the system runs in the reduced setting (e.g., reaching the temperature 438).

Thus, when the processing of the high demand task lasts for a long period of time, the system automatically adjusts its settings to allow the temperature to approach the limit (103) but not exceed the limit.

In one embodiment of the present invention, the prediction provides the upper bound of the temperature; and the actual temperature does not exceed the limit.

In one embodiment, the prediction may be lower than the upper bound of the temperature by a small margin; and the actual temperature may exceed the limit by the small margin. In one embodiment, since the time step to adjust the performance settings and the error margin are small, the amount exceeding above the temperature limit (103) is practically negligible. Thus, it can be practically considered that the limit (103) is not exceeded.

Thus, under the control of the dynamic throttling system, the system switches between the top setting and the reduced setting to process the high demand task as fast as possible within the limit of thermal constraint.

Figure 7:
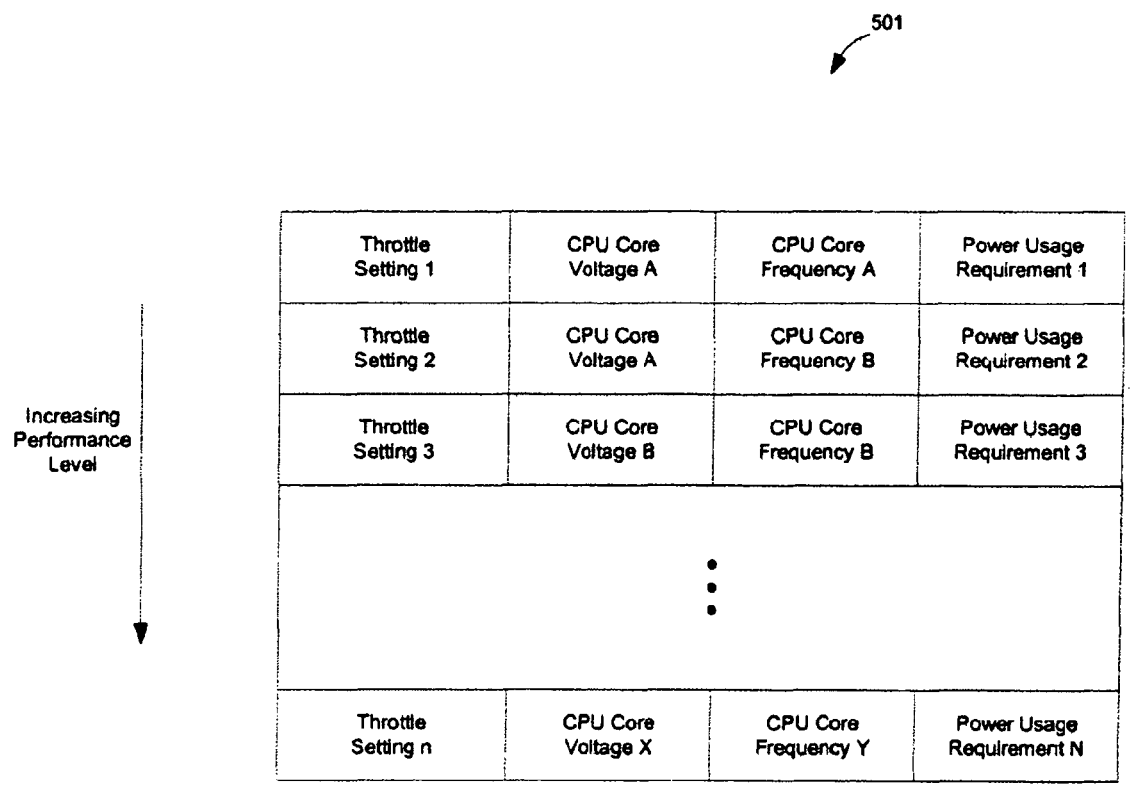
FIG. 7 illustrates an example of using throttle settings of a central processing unit (CPU) of a data processing system to control temperature according to one embodiment of the present invention.

FIG. 7 illustrates an example of using throttle settings of a central processing unit (CPU) of a data processing system to control temperature according to one embodiment of the present invention.

In FIG. 7, a number of different combinations of CPU core voltages and core frequencies are sorted so that the throttle setting increases with the performance level, as illustrated in table 501. In one embodiment, the system searches in the order of decreasing throttle setting to determine the first throttle setting that satisfies the relation that the predicted temperature is below the temperature limit.

Thus, when a throttle setting is determined, both the CPU core voltages and frequencies are determined.

Alternatively, the throttles may be sorted according to other goals (e.g., combined goal of high computing power and low energy consumption, etc.); and a "best" throttle setting can be searched in a similar way.

Note that if there are multiple independent throttles, a list of different combination of throttles can be examined to determine the allowable throttle settings. A best setting of the throttles can be selected according to certain rules that define the objective "best". It is understood that the rules for define the objective can be arbitrarily complex.

Figure 8:
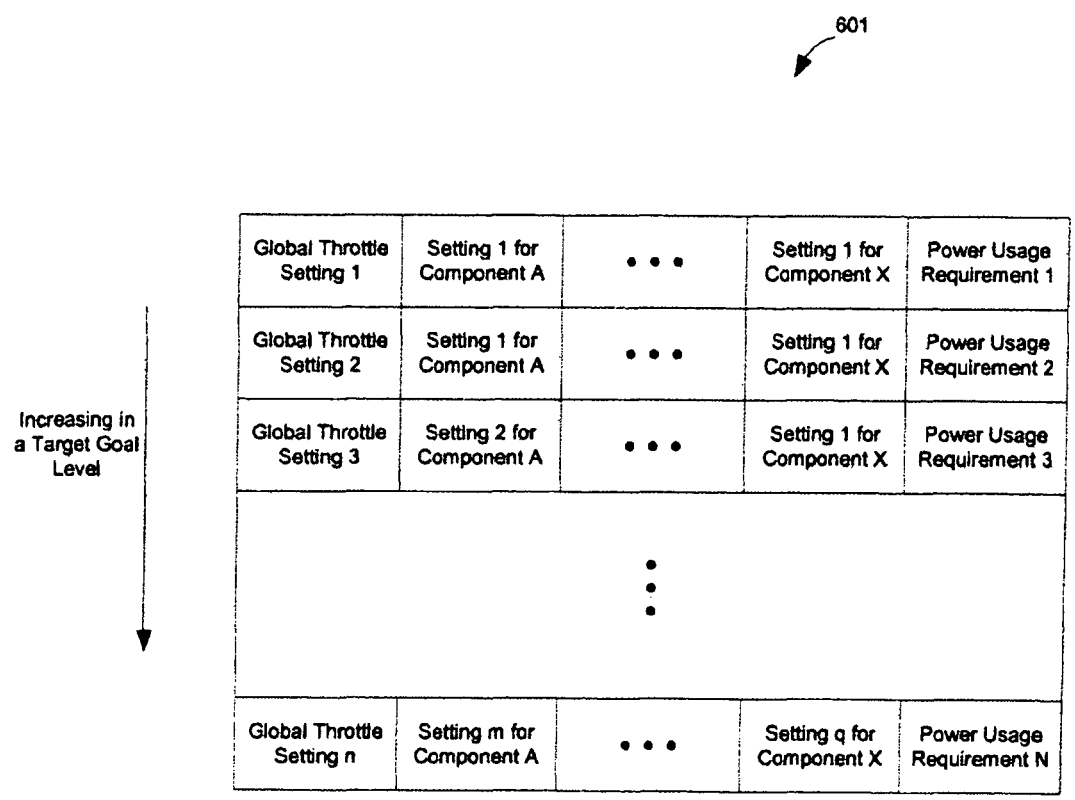
FIG. 8 illustrates an example of using throttle settings of multiple components of a data processing system to control temperature according to one embodiment of the present invention.

FIG. 8 illustrates an example of using throttle settings of multiple components of a data processing system to control temperature according to one embodiment of the present invention.

In FIG. 8, multiple components have independent throttle settings, as illustrated in table 601. To distribute the dynamically determined budget to the multiple components, different combinations of the throttle settings for the multiple components can be viewed as different global throttle settings. The global throttle settings can be sorted according to a target goal level.

The sorting of the global settings can be performed at the design stage of the computer according to a static, fixed target goal function, or manually arranged by the designer of the system.

Alternatively, the global settings can be performed in real time according to a target goal function, which may be a function of current state of the computer system. For example, some of the components may be busy and require higher priority while others may be in idle and require lower priority. Thus, the target function can be constructed to include the consideration of the current workloads of the components. The workloads can be estimated from the history of the actual power consumptions. For example, the high power consumption with respect to the dynamic power range of the component indicates a high workload for the component.

Once the global settings are sorted according to the target goal level, the highest global setting that satisfies the power constraint is selected.

Figure 9:
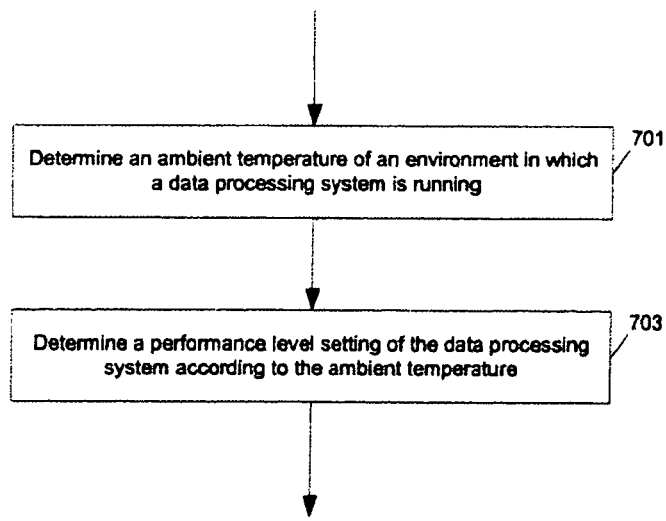
FIGS. 9-11 illustrate methods of thermal management according to embodiments of the present invention.
Figure 10:
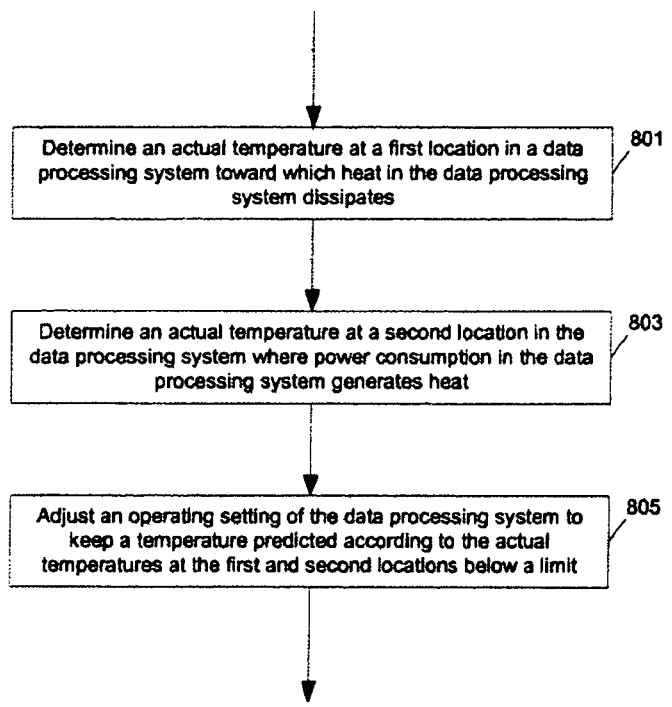
Figure 11:
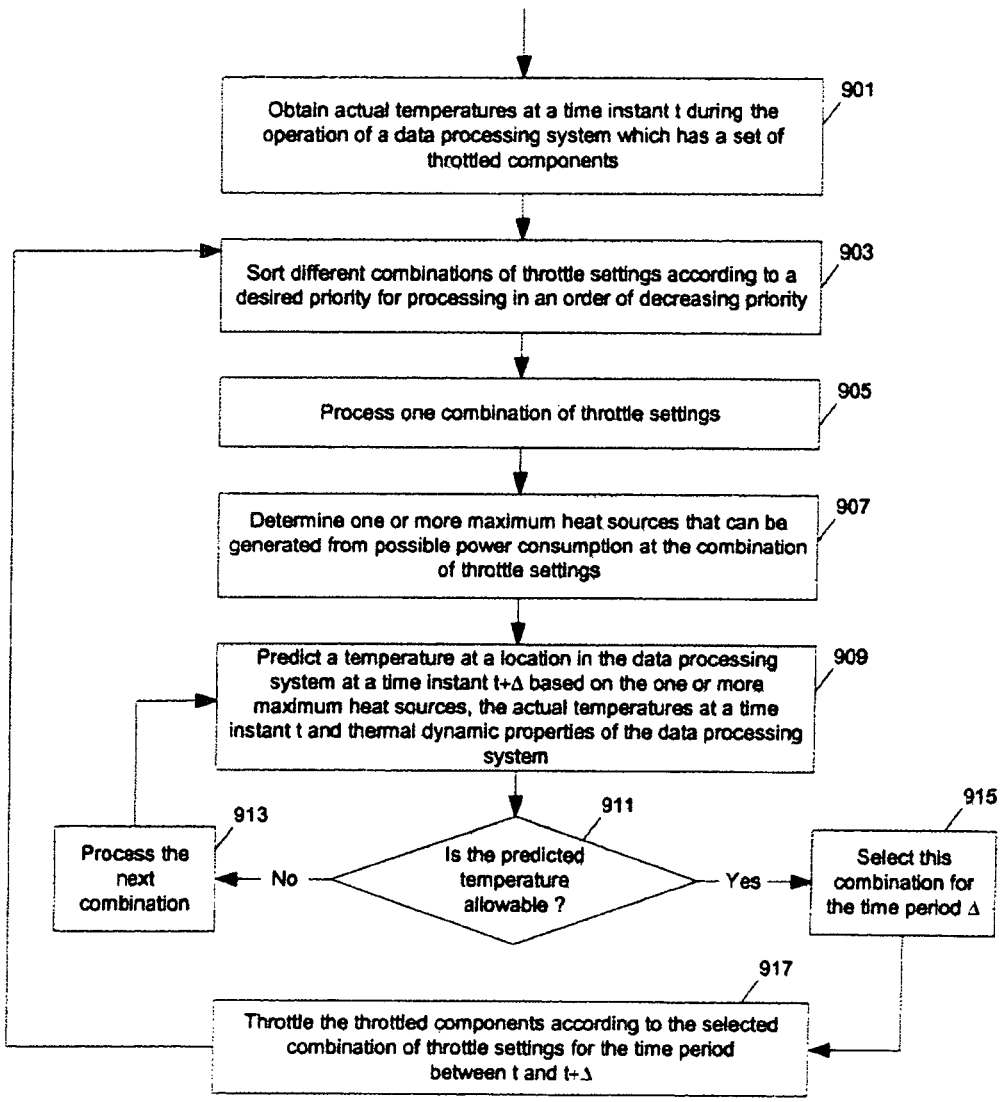

FIGS. 9-11 illustrate methods of thermal management according to embodiments of the present invention.

In FIG. 9, operation 701 determines an ambient temperature of an environment in which a data processing system is running. The ambient temperature can be measured at various locations as illustrate in FIG. 4, where the temperature measurements are not affected by the heat generated in computer system. However, it is understood that the influence of the heat generated in the computer system typically affects the temperature prediction in a conservative way (e.g., predict a higher temperature). Operation 703 determines a performance level setting (or operating setting) of the data processing system according to the ambient temperature. For example, a computer system can automatically select a performance level setting (or operating setting), such as CPU core voltage and frequency, based on the ambient temperature. For better performance, the selection may further based on other parameters, such as the current temperature of the computer, the length of time period in which the performance level setting (or operating setting) is used before the next update, etc.

For example, in FIG. 10, operation 801 determines an actual temperature at a first location in a data processing system toward which heat in the data processing system dissipates. Operation 803 determines an actual temperature at a second location in the data processing system where power consumption in the data processing system generates heat. Operation 805 adjusts an operating setting of the data processing system to keep a temperature predicted according to the actual temperatures at the first and second locations below a limit. In one embodiment, the prediction is based on the assumption that the data processing system will have the worst-case workload in a limited time period (e.g., in an order smaller or comparable to the thermal time constant of the system) during which the operating setting will be used. In one embodiment, different operating settings do not affect the functionality of the system except the performance of the system.

In FIG. 11, operation 901 obtains actual temperatures at a time instant t during the operation of a data processing system which has a set of throttled components. Operation 903 sorts different combinations of throttle settings according to a desired priority for processing in an order of decreasing priority. Operation 905 processes one combination of throttle settings. Operation 907 determines one or more maximum heat sources that can be generated from possible power consumption at the combination of throttle settings. Operation 909 predicts a temperature at a location in the data processing system at a time instant t+Δ based on the one or more maximum heat sources, the actual temperatures at a time instant t and thermal dynamic properties of the data processing system.

If operation 911 determines that the predicted temperature is not allowable, operation 913 processes the next combination and operation 909 is repeated until the predicted temperature is allowable.

If operation 911 determines that the predicted temperature is allowable, operation 915 selects this combination for use in the time period. Operation 917 throttles the throttled components according to the selected combination of throttle settings for the time period between t and t+Δ. In one embodiment, there will always be an allowed setting.

Many of the methods of the present invention may be performed with a digital processing system, such as a conventional, general-purpose computer system, or with a consumer electronic device. Special purpose computers, which are designed or programmed to perform only one function, or embedded devices or consumer electronic devices may also be used.

Figure 12:
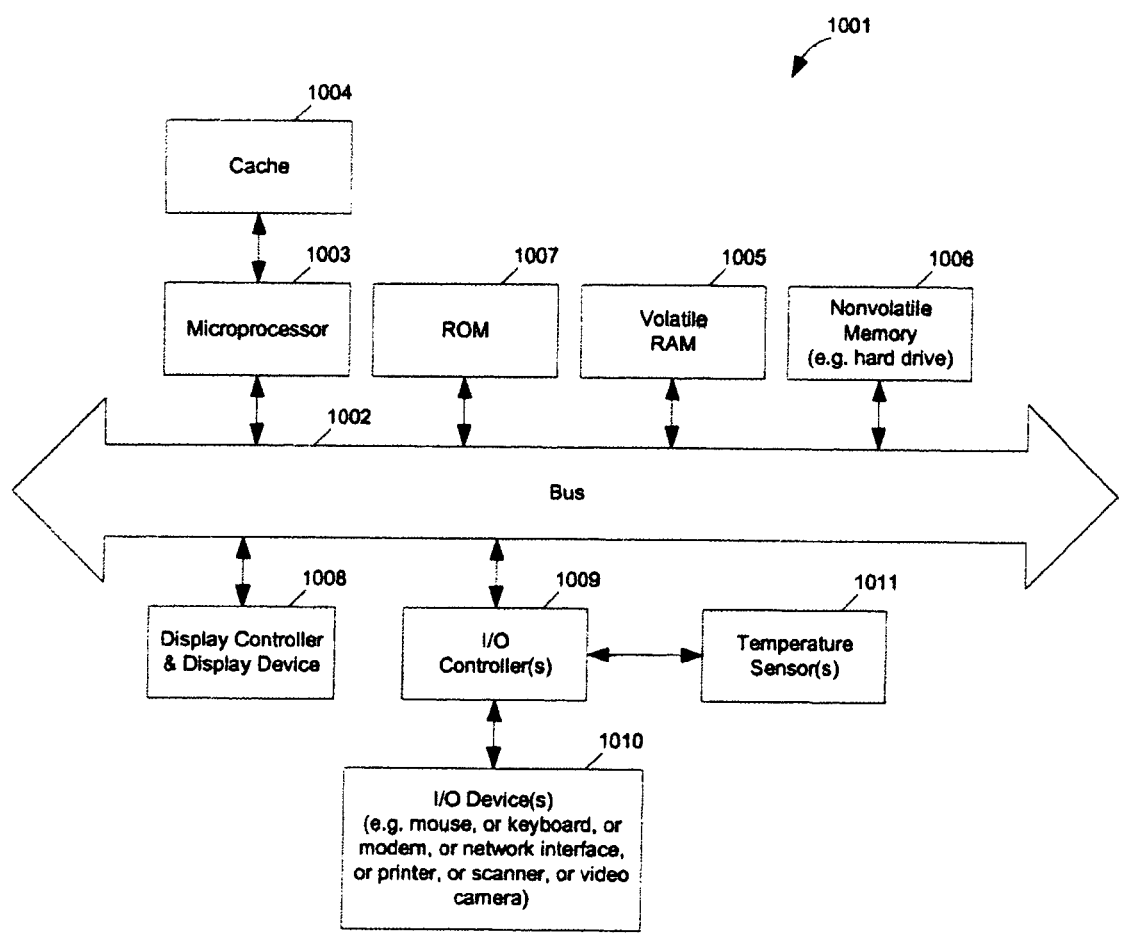
FIG. 12 shows a block diagram example of a data processing system which may be used with the present invention.

FIG. 12 shows one example of a typical computer system which may be used with the present invention. Note that while FIG. 12 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 12 may, for example, be an Apple Macintosh computer.

As shown in FIG. 12, the computer system 1001, which is a form of a digital data processing system, includes a bus 1002 which is coupled to a microprocessor 1003 and a ROM 1007 and volatile RAM 1005 and a non-volatile memory 1006. The microprocessor 1003, which may be, for example, a G3, G4, or G5 microprocessor from Motorola, Inc. or IBM is coupled to cache memory 1004 as shown in the example of FIG. 12. The bus 1002 interconnects these various components together and also interconnects these components 1003, 1007, 1005, and 1006 to a display controller and display device 1008 and to peripheral devices such as input/output (I/O) devices which may be mice, keyboards, modems, network interfaces, printers, scanners, video cameras and other devices which are well known in the art. Typically, the input/output devices 1010 are coupled to the system through input/output controllers 1009. The volatile RAM 1005 is typically implemented as dynamic RAM (DRAM) which requires power continually in order to refresh or maintain the data in the memory. The non-volatile memory 1006 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 12 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1002 may include one or more buses connected to each other through various bridges, controllers and/or adapters as is well known in the art. In one embodiment the I/O controller 1009 includes a USB (Universal Serial Bus) adapter for controlling USB peripherals, and/or an IEEE-1394 bus adapter for controlling IEEE-1394 peripherals.

In one embodiment of the present invention, at least some of the components can be actively throttled to trade performance for power usage (e.g., without changing functionality). For example, the microprocessor 1003 may have different core voltage and frequency settings.

In one embodiment of the present invention, the system 1001 further includes temperature sensor(s) 1011 that are coupled to the I/O controller(s) 1009. The temperature sensor(s) 1011 may include one or more sensors measuring the actual ambient temperature and one or more sensors measuring the actual temperatures of part of the system.

In one embodiment of the present invention, the system 1001 further includes a microcontroller (not shown in FIG. 12) which selects settings based on temperature prediction. Alternatively, the microprocessor 1003 may use the sensor measurements to select settings periodically.

In one embodiment of the present invention, the system 1001 further includes one or more fans with adjustable fan speed (not show in FIG. 12), which can be adjusted according to the real-time temperature prediction based on the sensor measurements.

It will be apparent from this description that aspects of the present invention may be embodied, at least in part, in software. That is, the techniques may be carried out in a computer system or other data processing system in response to its processor, such as a microprocessor or a microcontroller, executing sequences of instructions contained in a memory, such as ROM 1007, volatile RAM 1005, non-volatile memory 1006, cache 1004, or other storage devices or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 1003 or a microcontroller.

A machine readable medium can be used to store software and data which when executed by a data processing system causes the system to perform various methods of the present invention. This executable software and data may be stored in various places including for example ROM 1007, volatile RAM 1005, non-volatile memory 1006 and/or cache 1004 as shown in FIG. 12. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

The methods of the present invention can be implemented using dedicated hardware (e.g., using Field Programmable Gate Arrays, or Application Specific Integrated Circuit) or shared circuitry (e.g., microprocessors or microcontrollers under control of program instructions stored in a machine readable medium). The methods of the present invention can also be implemented as computer instructions for execution on a data processing system, such as system 1001 of FIG. 12.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A first data processing system having more than one component configurations depending upon whether a peripheral component is present in the first data processing system, comprising:
   a memory;
   an interface to receive at least one peripheral component; and
   a virtual temperature sensor capable of providing a first system temperature for the more than one component configurations of the first data processing system based at least on one of thermal time constant data of components of the first data processing system and system temperature data measured by one or more physical temperature sensors in each of the more than one component configurations, wherein the virtual temperature sensor calculates a predicted temperature based on whether the at least one peripheral component is installed into the interface and the virtual temperature sensor comprises a characterization table stored in the memory, the characterization table having the thermal time constant data of components of the first data processing system and system temperature data previously measured by one or more physical temperature sensors located on a second data processing system in each of the more than one component configurations, wherein the measured system temperature data on the second data processing system are processed to provide the thermal time constant data of components of the first data processing system, wherein the one or more physical temperature sensors measure temperatures other than an ambient air temperature and wherein the one or more physical temperature sensors are separate and different from a sensor for an ambient air temperature, wherein at least one of the thermal time constant data or the system temperature data measured by one or more physical temperature sensors are selected from the characterization table based at least in part on whether the at least one peripheral component is present in the first data processing system, wherein the virtual temperature sensor is configured to select at least a first one of the thermal time constant data and the system temperature data, if the at least one peripheral component is present in the first data processing system, and wherein the virtual temperature sensor is configured to select at least a second one of the thermal time constant data and the system temperature data, if the at least one peripheral component is not present in the first data processing system.

2. A system as in claim 1 wherein the virtual temperature sensor comprises a characterization model, wherein the characterization model uses the previously measured system temperature data for the more than one component configurations.

3. A system as in claim 2 wherein the characterization model further uses thermal characteristics of the components in the component configurations to provide time dependent estimates.

4. A system as in claim 1 wherein the input for the virtual temperature sensor comprises a power value for the first data processing system measured by a physical power sensor, power values for the components in the component configuration measured by one or more corresponding physical power sensors, a cooling level, or any combination thereof.

5. A system as in claim 1 wherein the output of the virtual temperature sensor comprises a time dependent temperature of the first data processing system, thermal characteristics of the components in the component configuration, or any combination thereof.

6. A system as in claim 1 wherein the output of the virtual temperature sensor comprises a physical temperature value for use by a controller adapted to receive values from a physical temperature sensor.

7. A system as in claim 1 further comprising an ambient temperature sensor for providing an ambient temperature of an environment of the first data processing system, wherein the first system temperature represents a difference between a second temperature of the configuration of the first data processing system and the ambient temperature.

8. The first data processing system of claim 1, wherein the peripheral component comprises at least one of a PCI card, a storage device, an ASA card, a hard drive, an optical drive, or a battery.

9. The first data processing system of claim 1, wherein the virtual temperature sensor is configured to calculate a first temperature, if the at least one peripheral component is installed into the interface, and wherein the virtual temperature sensor is configured to calculate a second temperature, if the if the at least one peripheral component is not installed into the interface.

10. The first data processing system of claim 1, wherein the first system temperature is determined for a first location of the first data processing system in a first one of the component configurations, and for a second location of the first data processing system in second one of the component configurations.

11. A first data processing system having more than one component configurations depending upon whether a peripheral component is present in the first data processing system, comprising:
    a memory;
    an interface to receive at least one peripheral component; and
    a virtual temperature sensor providing a first system temperature for a component configuration of the first data processing system based at least on one of the thermal time constant data of components of the first data processing system and system temperature data measured by one or more physical temperature sensors in each of the more than one component configurations, wherein the virtual temperature sensor calculates a predicted temperature based on whether the at least one peripheral component is installed into the interface, and the virtual temperature sensor comprises a characterization table stored in the memory, the characterization table having the thermal time constant data of components of the first data processing system and system temperature data previously measured by one or more physical temperature sensors located on a second data processing system in each of the more than one component configurations, wherein the measured system temperature data on the second data processing system are processed to provide the thermal time constant data of components of the first data processing system, wherein the one or more physical temperature sensors measure temperatures other than an ambient air temperature and wherein the one or more physical temperature sensors are separate and different from a sensor for an ambient air temperature, wherein at least one of the thermal time constant data or the system temperature data measured by one or more physical temperature sensors are selected from the characterization table based at least in part on whether the at least one peripheral component is present in the first data processing system, wherein the virtual temperature sensor is configured to select at least a first one of the thermal time constant data and the system temperature data, if the at least one peripheral component is present in the first data processing system, and wherein the virtual temperature sensor is configured to select at least a second one of the thermal time constant data and the system temperature data, if the at least one peripheral component is not present in the first data processing system;

a controller coupled to the virtual temperature sensor to control operations of the first data processing system according to a virtual temperature.

12. A system as in claim 11 wherein the virtual temperature sensor comprises a characterization model, wherein the characterization model uses the previously measured system temperature data for the more than one component configurations.

13. A system as in claim 11 wherein the input for the virtual temperature sensor comprises a power value for the first data processing system measured by a physical power sensor, power values for the components in the component configuration measured by one or more corresponding physical power sensors, a cooling level, or any combination thereof.

14. A system as in claim 11 wherein the output of the virtual temperature sensor comprises a time dependent temperature of the first data processing system, thermal characteristics of the components in the component configuration, or any combination thereof.

15. A system as in claim 11 further comprising an ambient temperature sensor for providing an ambient temperature of an environment of the first data processing system, wherein the first system temperature represents a difference between a second temperature of the configuration of the first data processing system and the ambient temperature.

16. A system as in claim 11, wherein the controller controls the operations of the first data processing system based on a prediction of a temperature of the first data processing system which is a function of the virtual temperature, and a current operating state of the first data processing system.

17. A system as in claim 16, wherein the controller selects cooling capacity settings to control operations of the first data processing system.

18. A system as in claim 16, wherein the controller selects one from combinations of one or more voltage settings and one or more frequency settings to control operations of the first data processing system; and the operating state of the first data processing system includes a voltage setting and a frequency setting.

19. A system as in claim 18, further comprising:
a voltage source, the voltage source capable of shifting from a first voltage to a second voltage to change a setting of the first data processing system without restarting or stopping the first data processing system; and
a frequency source, the frequency source capable of shifting from a first frequency to a second frequency to change a setting of the first data processing system without restarting or stopping the first data processing system.

20. A system as in claim 11, wherein the virtual temperature sensor is to determine the temperature of the first data processing system periodically for the controller to control the operations periodically.

21. A non-transitory machine readable medium containing executable computer program instructions which when executed by a first data processing system having more than one component configurations depending upon whether a peripheral component is present in the first data processing system, the first data processing system having an interface to receive at least one peripheral component, cause said system to perform a method to control the first data processing system, the method comprising:
calculating a virtual temperature representing a first system temperature for a component configuration of the first data processing system based at least on one of thermal time constant data of components of the first data processing system and system temperature data measured by one or more physical temperature sensors in each of the more than one component configurations, wherein the virtual temperature is calculated as a predicted temperature based on whether the at least one peripheral component is installed into the interface and based on the thermal time constant data for the at least one peripheral component, and system temperature data previously measured by one or more physical temperature sensors located on a second data processing system in each of the more than one component configurations and stored in a characterization table in a memory, wherein the previously measured system temperature data on the second data processing system are processed to provide the thermal time constant data for the at least one peripheral component of the first data processing system, wherein the one or more physical temperature sensors measure temperatures other than an ambient air temperature and wherein the one or more physical temperature sensors are separate and different from a sensor for an ambient air temperature, wherein at least a first one of the thermal time constant data and the system temperature data measured by one or more physical temperature sensors are selected from the characterization table if the at least one peripheral component is present in the first data processing system, and wherein at least a second one of the thermal time constant data and the system temperature data are selected from the characterization table, if the at least one peripheral component is not present in the first data processing system.

22. A medium as in claim 21 wherein the virtual temperature calculation comprises using a characterization model, wherein the characterization model uses the previously measured system temperature data for the more than one component configurations.

23. A medium as in claim 22 wherein the characterization model further comprises thermal characteristics of the components in the component configurations to provide time dependent estimates.

24. A medium as in claim 21 wherein the input for the virtual temperature calculation comprises a power value for the first data processing system measured by a physical power sensor, power values for the components in the component configuration measured by one or more corresponding physical power sensors, a cooling level, or any combination thereof.

25. A medium as in claim 21 wherein the output of the virtual temperature calculation comprises a time dependent temperature of the first data processing system, thermal characteristics of the components in the component configuration, or any combination thereof.

26. A medium as in claim 21 wherein the output of the virtual temperature calculation comprises a physical temperature value for use by a controller adapted to receive values from a physical temperature sensor.

27. A medium as in claim 21, the method further comprising:
determining an ambient temperature of an environment of the first data processing system for use in the calculating, wherein the first system temperature represents a difference between a second temperature of the configuration of the first data processing system and the ambient temperature.

28. A non-transitory machine readable medium containing executable computer program instructions which when executed by a first data processing system having more than one component configurations depending upon whether a peripheral component is present in the first data processing system and an interface to receive at least one peripheral component, cause said system to perform a method to control the first data processing system, the method comprising:
calculating a virtual temperature representing a first system temperature for a component configuration of the first data processing system based at least on one of thermal time constant data of components of the first data processing system and system temperature data measured by one or more physical temperature sensors in each of the more than one component configurations, wherein the virtual temperature is calculated as a predicted temperature based on whether the at least one peripheral component is installed into the interface and based on the thermal time constant data for the at least one peripheral component, and system temperature data previously measured by one or more physical temperature sensors located on a second data processing system in each of the more than one component configurations and stored in a characterization table in a memory, wherein the previously measured system temperature data on the second data processing system are processed to provide the thermal time constant data for the at least one peripheral component of the first data processing system, wherein the one or more physical temperature sensors measure temperatures other than an ambient air temperature and wherein the one or more physical temperature sensors are separate and different from a sensor for an ambient air temperature, wherein at least a first one of the thermal time constant data and the system temperature data measured by one or more physical temperature sensors are selected from the characterization table if the at least one peripheral component is present in the first data processing system and least a second one of the thermal time constant data and the system temperature data are selected from the characterization table, if the at least one peripheral component is not present in the first data processing system; and
controlling operations of the first data processing system according to a virtual temperature.

29. A medium as in claim 28 wherein the virtual temperature calculation comprises using a characterization model, wherein the characterization model uses previously measured system temperature data for the more than one component configurations.

30. A medium as in claim 29 wherein the input for the virtual temperature calculation comprises a power value for the first data processing system measured by a physical power sensor, power values for the components in the component configuration measured by one or more corresponding physical power sensors, a cooling level, or any combination thereof.

31. A medium as in claim 28 wherein the output of the virtual temperature calculation comprises a time dependent temperature of the first data processing system, thermal characteristics of the components in the component configuration, or any combination thereof.

32. A medium as in claim 28, the method further comprising:
determining an ambient temperature of an environment of the first data processing system for use in the calculating, wherein the first system temperature represents a difference between a second temperature of the configuration of the first data processing system and the ambient temperature.

33. A medium as in claim 32, wherein said controlling comprises:
selecting one from a plurality of cooling capacity settings according to the ambient temperature and the virtual temperature.

34. A medium as in claim 32, wherein said controlling comprises:
selecting one from a plurality of operating settings according to the ambient temperature and the virtual temperature.

35. A medium as in claim 34, wherein the plurality of operating settings comprise combinations of one or more voltages and one or more frequencies.

36. A medium as in claim 35, wherein said controlling further comprises:
shifting from a first voltage to a second voltage according to the one of the plurality of operating settings; and
shifting from a first frequency to a second frequency according to the one of the plurality of operating settings.

37. A method to control a first data processing system having more than one component configurations depending upon whether a peripheral component is present in the first data processing system, the first data processing system having an interface to receive at least one peripheral component, the method comprising:
calculating a virtual temperature representing a first system temperature for a component configuration of the first data processing system based at least on one of thermal time constant data of components of the first data processing system and system temperature data measured by one or more physical temperature sensors in each of the more than one component configurations, wherein the virtual temperature is calculated as a predicted temperature based on whether the at least one peripheral component is installed into the interface and based on the thermal time constant data for the at least one peripheral component, and system temperature data previously measured by one or more physical temperature sensors located on a second data processing system in each of the more than one component configurations and stored in a characterization table in a memory, wherein the previously measured system temperature data on the second data processing system are processed to provide the thermal time constant data for the at least one peripheral component of the first data processing system, wherein the one or more physical temperature sensors measure temperatures other than an ambient air temperature and wherein the one or more physical temperature sensors are separate and different from a sensor for an ambient air temperature, wherein at least a first one of the thermal time constant data and the system temperature data measured by one or more physical temperature sensors are selected from the characterization table if the at least one peripheral component is present in the first data processing system, and wherein at least a second one of the thermal time constant data and the system temperature data are selected from the characterization table, if the at least one peripheral component is not present in the first data processing system.

38. A method as in claim 37 wherein the virtual temperature calculation comprises using a characterization model, wherein the characterization model uses the measured system temperature data for the more than one component configurations.

39. A method as in claim 38 wherein the characterization model further uses thermal characteristics of the components in the component configurations to provide time dependent estimates.

40. A method as in claim 37 wherein the input for the virtual temperature calculation comprises a power value for the first data processing system measured by a physical power sensor, power values for the components in the component configuration measured by one or more corresponding physical power sensors, a cooling level, or any combination thereof.

41. A method as in claim 37 wherein the output of the virtual temperature calculation comprises a time dependent temperature of the first data processing system, thermal characteristics of the components in the component configuration, or any combination thereof.

42. A method as in claim 37 wherein the output of the virtual temperature calculation comprises a physical temperature value for use by a controller adapted to receive values from a physical temperature sensor.

43. A method as in claim 37 further comprising:
determining an ambient temperature of an environment of the first data processing system for use in the calculating,
wherein the first system temperature represents a difference between a second temperature of the configuration of the first data processing system and the ambient temperature.

44. A method to control a first data processing system having more than one component configurations depending upon whether at least one peripheral component is present in the first data processing system and an interface to receive at least one peripheral component, the method comprising:
calculating a virtual temperature representing a system temperature for a component configuration of the first data processing system based at least on one of thermal time constant data of components of the first data processing system and system temperature data measured by one or more physical temperature sensors in each of the more than one component configurations, wherein the virtual temperature is calculated as a predicted temperature based on whether the at least one peripheral component is installed into the interface and based on the thermal time constant data for the at least one peripheral component, and system temperature data previously measured by one or more physical temperature sensors located on a second data processing system in each of the more than one component configurations and stored in a characterization table in a memory, wherein the previously measured system temperature data on the second data processing system are processed to provide the thermal time constant data for the at least one peripheral component of the first data processing system, wherein the one or more physical temperature sensors measure temperatures other than an ambient air temperature and wherein the one or more physical temperature sensors are separate and different from a sensor for an ambient air temperature, wherein at least a first one of the thermal time constant data and the system temperature data measured by one or more physical temperature sensors are selected from the characterization table if the at least one peripheral component is present in first the data processing system, and at least a second one of the thermal time constant data and the system temperature data are selected from the characterization table, if the at least one peripheral component is not present in the first data processing system; and
controlling operations of the first data processing system according to the virtual temperature.

45. A method as in claim 44 wherein the virtual temperature calculation comprises using a characterization model, wherein the characterization model uses the measured system temperature data for the more than one component configurations.

46. A method as in claim 44 wherein the input for the virtual temperature calculation comprises a power value for the first data processing system measured by a physical power sensor, power values for the components in the component configuration measured by one or more corresponding physical power sensors, a cooling level, or any combination thereof.

47. A method as in claim 44 wherein the output of the virtual temperature calculation comprises a time dependent temperature of the first data processing system, thermal characteristics of the components in the component configuration, or any combination thereof.

48. A method as in claim 44 further comprising:
determining an ambient temperature of an environment of the first data processing system for use in the calculating,
wherein the system temperature represents the difference between the temperature of the configuration of the first data processing system and the ambient temperature.

49. A system as in claim 48, wherein said controlling comprises:
selecting one from a plurality of cooling capacity settings according to the ambient temperature and the virtual temperature.

50. A method as in claim 48, wherein said controlling comprises:
selecting one from a plurality of operating settings according to the ambient temperature and the virtual temperature.

51. A method as in claim 50, wherein the plurality of operating settings comprise combinations of one or more voltages and one or more frequencies.

52. A method as in claim 51, wherein said controlling further comprises:
  shifting from a first voltage to a second voltage according to the one of the plurality of operating settings; and
  shifting from a first frequency to a second frequency according to the one of the plurality of operating settings.

53. A first data processing system having more than one component configurations depending upon whether a peripheral component is present in the first data processing system and an interface to receive at least one peripheral component, comprising:
  means for determining a configuration of a component of the first data processing system;
  means for determining a virtual temperature representing a system temperature for the more than one component configurations of the first data processing system, wherein the virtual temperature is calculated as a predicted temperature based on whether the at least one peripheral component is installed into the interface and based on based on thermal time constant data for the at least one peripheral component, and system temperature data previously measured by one or more physical temperature sensors located on a second data processing system in each of the more than one component configurations and stored in a characterization table in a memory, wherein the one or more physical temperature sensors are configured to measure temperatures other than an ambient air temperature and are separate and different from a sensor for an ambient air temperature, wherein at least a first one of the thermal time constant data and the system temperature data measured by one or more physical temperature sensors are selected from the characterization table if the at least one peripheral component is present in the first data processing system, and wherein at least a second one of the thermal time constant data and the system temperature data are selected from the characterization table, if the at least one peripheral component is not present in the first data processing system.

54. A system as in claim 53 wherein the means for determining a virtual temperature comprises a characterization model, wherein the characterization model uses the measured system temperature data for the more than one component configurations.

55. A system as in claim 54 wherein the characterization model further uses thermal characteristics of the components in the component configurations to provide time dependent estimates.

56. A first data processing system having more than one component configurations depending upon whether a peripheral component is present in the first data processing system, the first data processing system having an interface to receive at least one peripheral component, comprising:
  means for determining a virtual temperature representing a system temperature for a component configuration of the first data processing system based at least on thermal time constant data of components of the first data processing system and system temperature data measured by one or more physical temperature sensors in each of the more than one component configurations, wherein the virtual temperature is calculated as a predicted temperature based on whether the at least one peripheral component is installed into the interface and based on the thermal time constant data for the at least one peripheral component, and system temperature data previously measured by one or more physical temperature sensors located on a second data processing system in each of the more than one component configurations and stored in a characterization table in a memory, wherein the previously measured system temperature data on the second data processing system are processed to provide the thermal time constant data for the at least one peripheral component of the first data processing system, wherein the one or more physical temperature sensors measure temperatures other than an ambient air temperature and wherein the one or more physical temperature sensors are separate and different from a sensor for an ambient air temperature, wherein at least a first one of the thermal time constant data and the system temperature data measured by one or more physical temperature sensors are selected from the characterization table if the at least one peripheral component is present in the first data processing system, and at least a second one of the thermal time constant data and the system temperature data are selected from the characterization table, if the at least one peripheral component is not present in the first data processing system; and
  means for controlling operations of the first data processing system according to the virtual temperature.

57. A non-transitory machine readable medium containing executable computer program instructions which when executed by a first data processing system, cause said system to perform a method to control the first data processing system having an interface to receive at least one peripheral component, the method comprising:
  calculating a parameter representing a first temperature for a component configuration of the first data processing system wherein the calculating uses as an input: (a) a power level measured by a physical power sensor; (b) a temperature sensor value previously measured by one or more physical temperature sensors located on a second data processing system in each of the more than one component configurations and stored in a characterization table in a memory, wherein the parameter is calculated as a predicted temperature based on whether the at least one peripheral component is installed into the interface and based on thermal time constant data for the at least one peripheral component, and system temperature data previously measured by one or more physical temperature sensors located on the second data processing system in more than one component configurations and stored in the characterization table in a memory, wherein the previously measured system temperature data on the second data processing system are processed to provide the thermal time constant data for the at least one peripheral component of the first data processing system, wherein the one or more physical temperature sensors measure temperatures other than an ambient air temperature and wherein the one or more physical temperature sensors are separate and different from a sensor for an ambient air temperature; (c) a configuration information including information about whether the at least one peripheral component is received by the interface of the first data processing system; and (d) a cooling level, wherein at least a first one of thermal time constant data of components of the first data processing system and the temperature sensor value measured by one or more physical temperature sensors are selected from the characterization table if the at least one peripheral component is present in the first data processing system, and wherein at least a second one of the thermal time constant data and the system temperature data are selected from the characterization table, if the at least one peripheral component is not present in the first data processing system.

58. A medium as in claim 57 wherein the calculating comprises using a characterization model, wherein the characterization model uses the measured system temperature data for the more than one component configuration and wherein the parameter is used in a closed loop control of at least one of thermal status or power status of the first data processing system.

59. A medium as in claim 58 wherein the characterization model further uses thermal characteristics of the components in the component configuration to provide time dependent estimates.

60. A medium as in claim 57 wherein the input for the calculating comprises a power value for the first data processing system measured by a physical power sensor, power values for the components in the component configuration measured by one or more corresponding physical power sensors, a component configuration, a cooling level, or any combination thereof.

61. A medium as in claim 57 wherein the output of the calculating comprises a time dependent temperature of the first data processing system, thermal characteristics of the components in the component configuration, or any combination thereof.

62. A medium as in claim 57 wherein the output of the calculating provides a physical temperature value for use by a controller adapted to receive values from a physical temperature sensor.

63. A medium as in claim 57, the method further comprising:
determining an ambient temperature of an environment of the first data processing system for use as the temperature sensor value,
wherein the first temperature represents a difference between a second temperature of the configuration of the first data processing system and the ambient temperature.

64. A non-transitory machine readable medium containing executable computer program instructions which when executed by a first data processing system having more than one component configurations depending upon whether a peripheral component is present in the first data processing system and an interface to receive at least one peripheral component, cause said system to perform a method to control the first data processing system, the method comprising:
calculating a parameter representing a first temperature for a component configuration of the first data processing system wherein the calculating uses as an input: (a) a power level measured by a physical power sensor; (b) a temperature sensor value previously measured by one or more physical temperature sensors located on a second data processing system for the more than one component configurations and stored in a characterization table in a memory, wherein the parameter is calculated as a predicted temperature based on whether the at least one peripheral component is installed into the interface and based on thermal time constant data for the at least one peripheral component, and system temperature data previously measured by one or more physical temperature sensors located on the second data processing system in more than one component configurations and stored in the characterization table in the memory, wherein the previously measured system temperature data on the second data processing system are processed to provide the thermal time constant data for the at least one peripheral component of the first data processing system, wherein the one or more physical temperature sensors measure temperatures other than an ambient air temperature and wherein the one or more physical temperature sensors are separate and different from a sensor for an ambient air temperature; (c) a configuration information including information about whether the at least one peripheral component is present in the first data processing system; and (d) a cooling level, wherein at least a first one of thermal time constant data of components of the first data processing system and the temperature sensor value measured by one or more physical temperature sensors is selected from the characterization table if the at least one peripheral component is present in the first data processing system, and wherein at least a second one of the thermal time constant data and the system temperature data are selected from the characterization table, if the at least one peripheral component is not present in the first data processing system; and
controlling operations of the first data processing system according to the parameter.

65. A medium as in claim 64 wherein the calculating comprises using a characterization model, wherein the characterization model uses the measured system temperature data for the more than one component configurations.

66. A medium as in claim 65 wherein the input for the calculating comprises a power value for the first data processing system measured by a physical power sensor, power values for the components in the component configuration measured by one or more corresponding physical power sensors, a component configuration, a cooling level, or any combination thereof.

67. A medium as in claim 64 wherein the output of the calculating comprises a time dependent temperature of the first data processing system, thermal characteristics of the components in the component configuration, or any combination thereof.

68. A medium as in claim 64, the method further comprising:
determining an ambient temperature of an environment of the first data processing system for use as the temperature sensor value,
wherein the first temperature represents a difference between a second temperature of the configuration of the first data processing system and the ambient temperature.

69. A medium as in claim 68, wherein the controlling selects one cooling capacity from a plurality of cooling capacity settings according to the ambient temperature and the temperature.

70. A medium as in claim 69, wherein the plurality of operating settings comprise combinations of one or more voltages and one or more frequencies.

71. A medium as in claim 70, wherein the controlling further comprises:
shifting from a first voltage to a second voltage according to the one of the plurality of operating settings; and
shifting from a first frequency to a second frequency according to the one of the plurality of operating settings.

72. A medium as in claim 68, wherein the controlling comprises:
selecting one from a plurality of operating settings according to the ambient temperature and the temperature.

73. A method to control a first data processing system having more than one component configurations depending upon whether a peripheral component is present on the first data processing system and an interface to receive at least one peripheral component, the method comprising:
calculating a parameter representing a first temperature for a component configuration of the first data processing system wherein the calculating uses as an input: (a) a power level measured by a physical power sensor; (b) a temperature sensor value previously measured by one or more physical temperature sensors located on a second data processing system for the more than one component configurations and stored in a characterization table in a memory, wherein the parameter is calculated as a predicted temperature based on whether the at least one peripheral component is installed into the interface and based on thermal time constant data for the at least one peripheral component, and system temperature data previously measured by one or more physical temperature sensors located on the second data processing system in more than one component configurations and stored in the characterization table in a memory, wherein the previously measured system temperature data on the second data processing system are processed to provide the thermal time constant data for the at least one peripheral component of the first data processing system, wherein the one or more physical temperature sensors measure temperatures other than an ambient air temperature and wherein the one or more physical temperature sensors are separate and different from a sensor for an ambient air temperature; (c) a configuration information including information about whether the at least one peripheral component is received by the interface of the first data processing system; and (d) a cooling level, wherein at least a first one of thermal time constant data of components of the first data processing system and the temperature sensor value measured by one or more physical temperature sensors is selected from the characterization table if the at least one peripheral component is present in the first data processing system, and wherein at least a second one of the thermal time constant data and the system temperature data is selected from the characterization table, if the at least one peripheral component is not present in the first data processing system.

74. A method as in claim 73 wherein the calculating comprises using a characterization model, wherein the characterization model uses the measured system temperature data for the more than one component configuration and wherein the parameter is used in a closed loop control of at least one of thermal status or power status of the first data processing system.

75. A method as in claim 74 wherein the characterization model further uses thermal characteristics of the components in the component configurations to provide time dependent estimates.

76. A method as in claim 73 wherein the input for the calculating comprises a power value for the first data processing system measured by a physical power sensor, power values for the components in the component configuration measured by one or more corresponding physical power sensors, a component configuration, a cooling level, or any combination thereof.

77. A method as in claim 73 wherein the output of the calculating comprises a time dependent temperature of the first data processing system, thermal characteristics of the components in the component configuration, or any combination thereof.

78. A method as in claim 73 wherein the output of the calculating comprises a physical temperature value for use by a controller adapted to receive values from a physical temperature sensor.

79. A method as in claim 73 further comprising:
determining an ambient temperature of an environment of the first data processing system for use as the temperature sensor value,
wherein the first temperature represents a difference between a second temperature of the configuration of the first data processing system and the ambient temperature.

80. A method to control a first data processing system having more than one component configurations depending upon whether a peripheral component is present in the first data processing system and an interface to receive at least one peripheral component, the method comprising:
calculating a parameter representing a first temperature for a component configuration of the first data processing system wherein the calculating uses as an input: (a) a power level measured by a physical power sensor; (b) a temperature sensor value previously measured by one or more physical temperature sensors located on a second data processing system for the more than one component configurations and stored in a characterization table in a memory, wherein the parameter is calculated as a predicted temperature based on whether the at least one peripheral component is installed into the interface and based on thermal time constant data for the at least one peripheral component, and system temperature data previously measured by one or more physical temperature sensors located on the second data processing system in more than one component configurations and stored in a characterization table in a memory, wherein the previously measured system temperature data on the second data processing system are processed to provide the thermal time constant data for the at least one peripheral component of the first data processing system, wherein the one or more physical temperature sensors measure temperatures other than an ambient air temperature and wherein the one or more physical temperature sensors are separate and different from a sensor for an ambient air temperature; (c) a configuration information including information about whether the at least one peripheral component is present in the first data processing system; and (d) a cooling level, wherein at least a first one of thermal time constant data of components of the first data processing system and the temperature sensor value measured by one or more physical temperature sensors is selected from the characterization table if the at least one peripheral component is present in the first data processing system, and wherein at least a second one of the thermal time constant data and the system temperature data is selected from the characterization table, if the at least one peripheral component is not present in the first data processing system; and
controlling operations of the first data processing system according to the parameter.

81. A method as in claim 80 wherein the calculating comprises using a characterization model, wherein the characterization model uses the measured system temperature data for the more than one component configurations.

82. A method as in claim 80 wherein the input for the calculating comprises a power value for the first data processing system measured by one or more corresponding physical power sensors, power values for the components in the component configuration measured by one or more corresponding physical power sensors, a component configuration, a cooling level, or any combination thereof.

83. A method as in claim 80 wherein the output of the calculating comprises a time dependent temperature of the first data processing system, thermal characteristics of the components in the component configuration, or any combination thereof.

84. A method as in claim 80 further comprising:
determining an ambient temperature of an environment of the first data processing system for use as the temperature sensor value,
wherein the first temperature represents a difference between a second temperature of the configuration of the first data processing system and the ambient temperature.

* * * * *